(12) United States Patent
Ukita et al.

(10) Patent No.: US 9,027,865 B2
(45) Date of Patent: May 12, 2015

(54) WEBBING WINDING DEVICE

(75) Inventors: Masaru Ukita, Aichi-ken (JP); Wataru Yanagawa, Aichi-ken (JP); Yoshiaki Maekubo, Aichi-ken (JP); Takayoshi Ando, Aichi-ken (JP)

(73) Assignee: Kabuhiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 431 days.

(21) Appl. No.: 13/525,921

(22) Filed: Jun. 18, 2012

(65) Prior Publication Data
US 2012/0318904 A1    Dec. 20, 2012

(30) Foreign Application Priority Data

Jun. 20, 2011  (JP) ................ 2011-136389

(51) Int. Cl.
*B65H 75/48* (2006.01)
*B60R 22/34* (2006.01)

(52) U.S. Cl.
CPC ................ *B60R 22/3413* (2013.01)

(58) Field of Classification Search
USPC ......... 242/379.1, 374; 280/805; 297/470–472
See application file for complete search history.

(56) References Cited

U.S. PATENT DOCUMENTS 6,450,435 B2 *  9/2002  Junker et al. ............... 242/374
2008/0203210 A1 *  8/2008  Nagata et al. ............. 242/396.1

FOREIGN PATENT DOCUMENTS

JP       2003-502204         1/2003

* cited by examiner

*Primary Examiner* — Emmanuel M Marcelo
*Assistant Examiner* — Angela Caligiuri
(74) *Attorney, Agent, or Firm* — Roberts Mlotkowski Safran & Cole P.C.

(57) ABSTRACT

In a webbing winding device, even when a piston moves toward the other side in a movement direction due to a reaction when the piston moves to a maximum movement position, an engagement surface of a hook portion comes into contact with a subject engagement surface of a subject engagement portion, so that the movement of the piston toward the other side in the movement direction is restricted. Accordingly, the piston is prevented from returning to a standby position, and a pawl is prevented from returning to a lock position. For this reason, a state where a rotation of a locking ring in the pull-out direction is maintained. Accordingly, after the piston moves from the standby position to the maximum movement position, the piston is prevented from returning to the standby position, and the force limiter load is prevented from being changed.

14 Claims, 14 Drawing Sheets

WEBBING WINDING DEVICE

CROSS-REFERENCE TO RELATED APPLICATION

This application claims priority under 35 USC 119 from Japanese Patent Application No. 2011-136389 filed Jun. 20, 2011, the disclosure of which is incorporated by reference herein.

BACKGROUND OF THE INVENTION

1. Field of the Invention

The present invention relates to a webbing winding device which permits a rotation of a spool in a pull-out direction with larger than or equal to a force limiter load at least one of a time when a vehicle rapidly decelerates or a time when the spool rapidly rotates in the pull-out direction.

2. Related Art

In a belt winding unit disclosed in Japanese Patent Application National Publication No. 2003-502204, a belt shaft (a spool) and a locking side unit (a locking mechanism) are connected to each other through a torsion bar. Further, when the rotation of the locking unit is inhibited by sensing the state of a vehicle or a belt stripe, the torsion bar is twisted, so that the rotation of the belt shaft in the pull-out direction with larger than or equal to the force limiter load is permitted.

Further, the belt winding unit is equipped with a driving device, and the piston straightly moves when the driving device is operated. Furthermore, the piston pushes a step portion of an operation ring when the piston straightly moves, so that the operation ring moves in the axial direction. Accordingly, a claw which meshes with a torque tube provided inside the belt shaft swings, so that the meshing between the claw and the torque tube is released. Thus, the load value of the force limiter load changes from a high load to a low load.

However, in the belt winding unit, after the piston straightly moves with the operation of the driving device, the piston may move in the direction opposite to the movement direction due to the reaction. In this case, there is a possibility that the re-meshing between the claw and the torque tube is occurred so the load value of the force limiter load which has been changed to the low load is changed to the high load.

SUMMARY OF THE INVENTION

The invention is made in view of the above-described circumstances, and it is an object of the invention to provide a webbing winding device capable of preventing a load value of a force limiter load from being changed by preventing a piston from returning to a standby position after the piston moves from the standby position to a maximum movement position.

According to a first aspect of the invention, there is provided a webbing winding device including: a spool on which a webbing to be applied to a passenger is wound and which is rotated in a pull-out direction by the webbing being pulled out; a locking portion which inhibits rotation of the spool in the pull-out direction at least one of a time when a vehicle rapidly decelerates or a time when the spool rapidly rotates in the pull-out direction; a force limiter mechanism which permits rotation of the spool in the pull-out direction with a load larger than or equal to a force limiter load when the locking portion inhibits rotation of the spool in the pull-out direction; a pawl configured to be able to be positioned at a first position and at a second position, the pawl being able to change a load value of the force limiter load in accordance with an arranged position of the pawl; a piston which is linearly movable between a standby position and a maximum movement position, the piston moving from the standby position toward one side in a movement direction of the piston by being activated so that the pawl is positioned from the first position to the second position; an accommodation portion which accommodates the piston; an engaged portion which is provided in the accommodation portion; and an engagement portion which includes an arm portion provided in the piston so as to be elastically deformable and a hook portion provided protruding from the arm portion toward a side of the engaged portion, the engagement portion permitting movement of the piston toward the one side in the movement direction by the hook portion sliding on the engaged portion so that the arm portion is elastically deformed, and the engagement portion restricting movement of the piston toward the other side in the movement direction by the hook portion engaging with the engaged portion.

In the webbing winding device according to the first aspect of the invention, the locking portion inhibits the rotation of the spool in the pull-out direction at least one of the time when the vehicle rapidly decelerates or the time when the spool rapidly rotates in the pull-out direction. Further, at this time, the rotation of the spool in the pull-out direction with the load larger than or equal to the force limiter load is permitted by the force limiter mechanism.

Further, the pawl is configured to be arranged at the first position and the second position, and the load value of the force limiter load is changed in accordance with the arranged position of the pawl.

Furthermore, the piston which is accommodated in the accommodation portion is straightly movable between the standby position and the maximum movement position, and the piston moves from the standby position toward the one side in the movement direction with the operation (activation) of the piston, so that the pawl is disposed at from the first position toward the second position. Accordingly, the load value of the force limiter load is changed.

Here, the accommodation portion which accommodates the piston is provided with the engaged portion, and the piston is provided with the engagement portion. Further, the engagement portion includes the arm portion which is elastically deformable and the hook portion which protrudes from the arm portion toward the engaged portion side. Furthermore, when the piston moves toward the one side in the movement direction, the hook portion slides on the engaged portion, and the arm portion is elastically deformed, so, permits the movement of the piston toward the one side in the movement direction. Accordingly, the piston can move from the standby position to the maximum movement position. On the other hand, when the piston moves toward the other side in the movement direction, the hook portion engages with the engaged portion, which restricts the movement of the piston toward the other side in the movement direction. Accordingly, since the hook portion engages with the engaged portion even when the piston moves toward the standby position due to the reaction after the piston moves to the maximum movement position, the movement of the piston toward the other side in the movement direction is restricted. Accordingly, the piston is prevented from returning to the standby position, and the pawl is prevented from returning to the first position. Accordingly, the changed load value of the force limiter load is prevented from being changed.

According to the webbing winding device of a second aspect of the invention, the webbing winding device of the first aspect of the invention further includes a stopper portion which is provided in the piston, and which is disposed to be offset with respect to the engagement portion when seen from the one side in the movement direction of the piston, the stopper portion restricting movement of the piston toward the one side in the movement direction at the maximum movement position by the stopper portion abutting with the accommodation portion.

In the webbing winding device according to the second aspect of the invention, the piston is provided with the stopper portion, and by that the stopper portion comes into contact with the accommodation portion, the movement of the piston toward the one side in the movement direction at the maximum movement position is restricted. For this reason, when the piston moves from the standby position to the maximum movement position, the piston is stopped by the stopper portion. Furthermore, the stopper portion is disposed so as to be offset with respect to the engagement portion when seen from the one side in the movement direction of the piston. For this reason, the portion of the accommodation portion coming into contact with the stopper portion is disposed so as to be offset with respect to the engagement portion. Accordingly, when the piston moves from the standby position toward the maximum movement position, the engagement portion does not interfere with the portion of the accommodation portion coming into contact with the stopper portion.

According to the webbing winding device of a third aspect of the invention, in the webbing winding device of the first aspect or the second aspect of the invention, the arm portion extends along the movement direction of the piston between the piston and the engaged portion, both end portions of the arm portion in a longitudinal direction are connected to the piston, and the hook portion is provided at an intermediate portion of the arm portion in the longitudinal direction.

In the webbing winding device of the third aspect of the invention, the arm portion extends along the movement direction of the piston between the piston and the engaged portion, and the hook portion is provided at the intermediate portion of the arm portion in the longitudinal direction. Further, both end portions of the arm portion in the longitudinal direction are connected to the piston.

For this reason, the engagement portion is structured as a both-end support beam. Accordingly, when the arm portion is elastically deformed, the arm portion is displaced, at the position of the hook portion, in a direction substantially perpendicular to the extension direction of the arm portion, so that the deformation region of the arm portion decreases.

According to the webbing winding device of a fourth aspect of the invention, in the webbing winding device of the third aspect of the invention, the arm portion includes a first arm portion which is disposed at the one side in the movement direction of the piston with respect to the hook portion and a second arm portion which is disposed at the other side in the movement direction of the piston with respect to the hook portion, and a thickness of the second arm portion is set to be smaller than a thickness of the first arm portion.

In the webbing winding device of the fourth aspect of the invention, the arm portion includes the first arm portion and the second arm portion. The first arm portion is disposed at the one side in the movement direction of the piston with respect to the hook portion, and the second arm portion is disposed at the other side in the movement direction of the piston with respect to the hook portion. Here, the thickness of the second arm portion is set to be smaller than the thickness of the first arm portion.

For this reason, the mechanical strength of the second arm portion is set to be smaller than the mechanical strength of the first arm portion. For example, by that the thickness of the second arm portion is set so that the second arm portion is broken with respect to the maximum elastic deformation amount of the arm portion, the second arm portion can be broken when the arm portion is such elastically deformed. The hook portion is immediately returned to the engaged portion after the second arm portion is broken since the engagement portion is structured as a cantilever support beam.

According to the webbing winding device of a fifth aspect of the invention, in the webbing winding device of the fourth aspect of the invention, the second arm portion is provided with a fragile portion.

In the webbing winding device of the fifth aspect of the invention, since the second arm portion is provided with the fragile portion, the second arm portion is easily broken at the fragile portion.

According to the webbing winding device of a sixth aspect of the invention, the webbing winding device of the fifth aspect of the invention further includes a groove portion which is provided in the second arm portion and is disposed at the fragile portion at a side of the piston.

In the webbing winding device of the sixth aspect of the invention, the second arm portion is provided with the groove portion, and the groove portion is provided at the piston side at the fragile portion. Further, since the arm portion is deflected toward the piston when the arm portion is elastically deformed, a tensile force acts on the portion at the piston side of the arm portion. For this reason, when the arm portion is elastically deformed, a tensile force acts on the portion at the groove portion side of the fragile portion, so that the stress concentrates on the portion. Accordingly, the arm portion is more easily broken at the portion.

According to a seventh aspect of the invention, there is provided a webbing winding device including: a spool on which a webbing to be applied to a passenger is wound and which is rotated in a pull-out direction by the webbing being pulled out; a locking portion which inhibits rotation of the spool in the pull-out direction at least one of a time when a vehicle rapidly decelerates or a time when the spool rapidly rotates in the pull-out direction; a force limiter mechanism which permits rotation of the spool in the pull-out direction with a load larger than or equal to a force limiter load when the locking portion inhibits rotation of the spool in the pull-out direction; a pawl configured to be able to be positioned at a first position and at a second position, the pawl being able to change a load value of the force limiter load in accordance with an arranged position of the pawl; a piston which is linearly movable between a standby position and a maximum movement position, the piston moving from the standby position toward one side in a movement direction of the piston by being activated so that the pawl is positioned from the first position to the second position; an accommodation portion which accommodates the piston; an engaged portion which is provided in one of the accommodation portion or the piston; and an engagement portion which includes an elastic portion provided in the other of the accommodation portion or the piston so as to be elastically deformable and a hook portion provided at the elastic portion toward a side of the engaged portion, the engagement portion permitting movement of the piston toward the one side in the movement direction by the hook portion sliding on the engaged portion so that the elastic portion is elastically deformed, and the engagement portion restricting movement of the piston toward the other side in the movement direction by the hook portion engaging with the engaged portion.

It is possible in the above aspects that the engaged portion includes a slope surface and an engaged surface, and the hook portion includes a slide-surface and an engagement surface, and the engagement portion permits movement of the piston, toward the one side in the movement direction, by the slide-surface sliding on the slope surface so that the arm portion is elastically deformed, and the engagement portion restricts movement of the piston, toward the other side in the movement direction, by the engagement surface engaging with the engaged surface.

According to the webbing winding device of the first aspect of the invention, it is possible to prevent the load value of the force limiter load from being changed by preventing the piston from returning to the standby position after the piston moves from the standby position toward the maximum movement position.

According to the webbing winding device of the second aspect of the invention, the piston can be provided with the stopper portion which stops the piton at the maximum movement position without affecting the movement of the engagement portion.

According to the webbing winding device of the third aspect of the invention, it is possible to decrease the deformation region of the arm portion when the arm portion is elastically deformed.

According to the webbing winding device of the fourth aspect of the invention, it is possible to immediately return the hook portion toward the engaged portion side.

According to the webbing winding device of the fifth aspect of the invention, it is possible to control the break-portion of the second arm portion.

According to the webbing winding device of the sixth aspect of the invention, it is possible to more easily control the break-portion of the second arm portion.

BRIEF DESCRIPTION OF THE DRAWINGS

Embodiments of the invention will be described in detail with reference to the following figures, wherein.

DETAILED DESCRIPTION OF THE INVENTION

Figure 1:
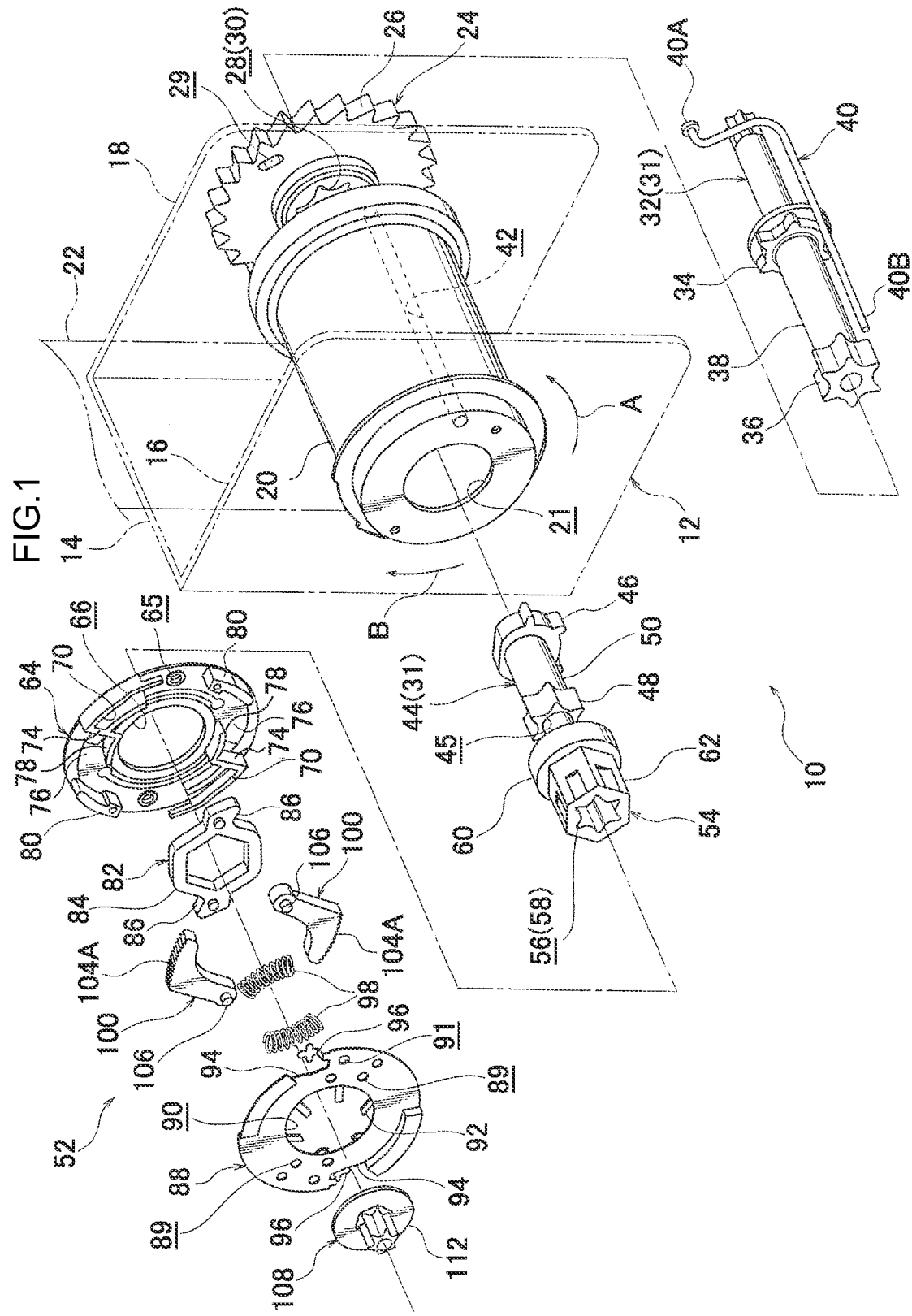
FIG. 1 is an exploded perspective view illustrating a configuration of a main portion of a webbing winding device according to an embodiment of the invention.

Hereinafter, referring to the drawings, an embodiment of the invention will be described.

Figure 2:
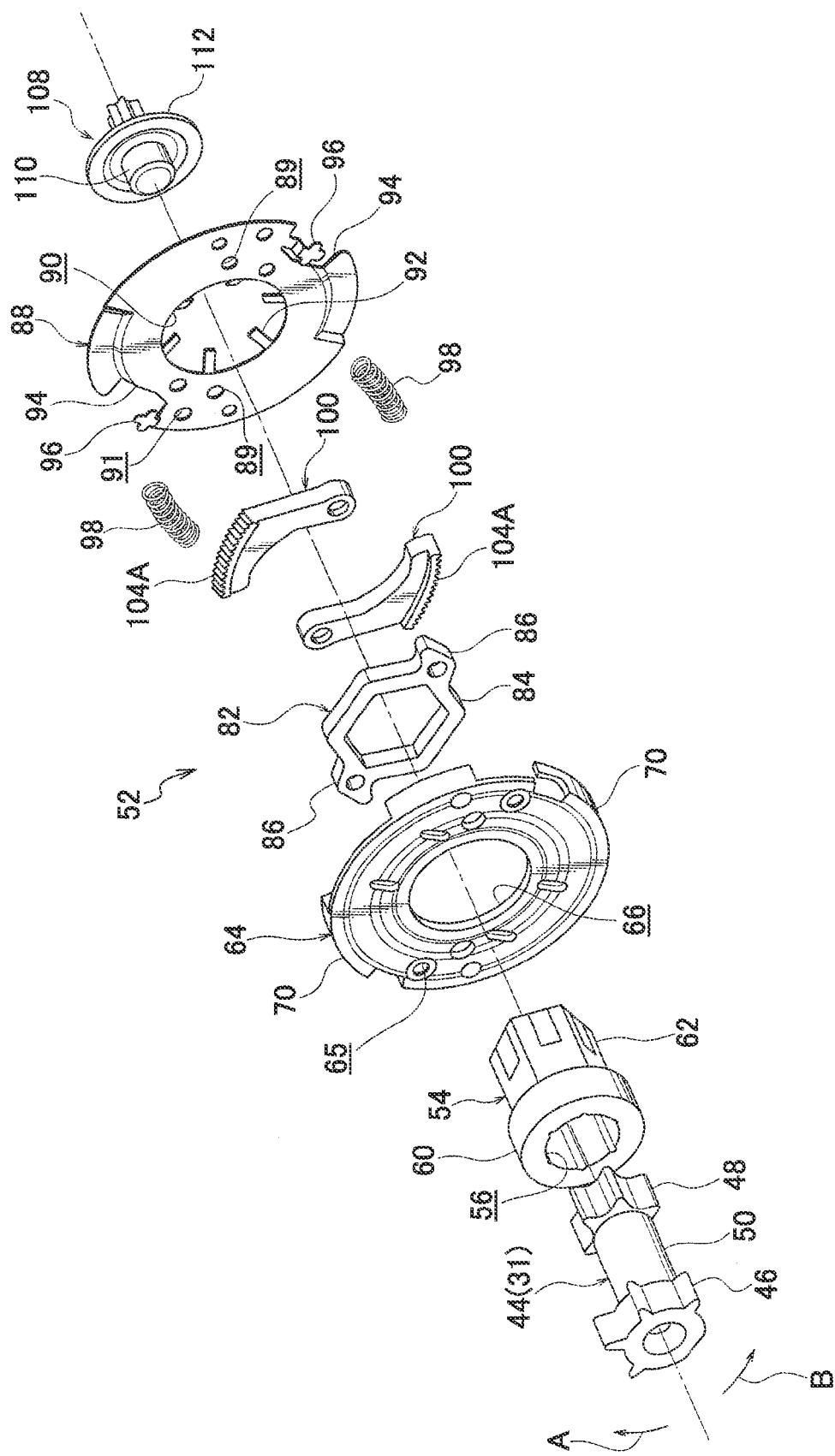
FIG. 2 is an exploded perspective view illustrating a configuration of a clutch mechanism which is a constituting member of the webbing winding device illustrated in FIG. 1.
Figure 6:
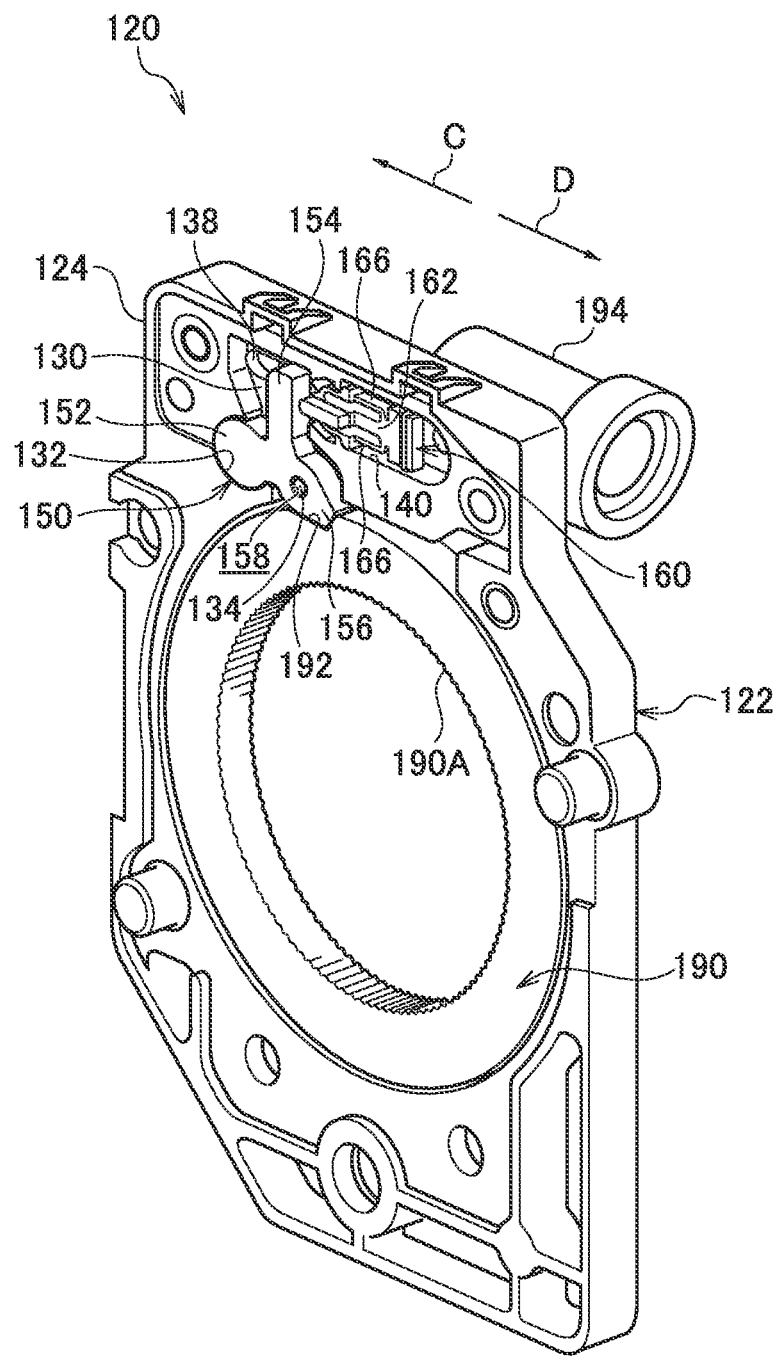
FIG. 6 is a perspective view illustrating the switching mechanism which is the constituting member of the webbing winding device illustrated in FIG. 1.

As illustrated in FIGS. 1, 2, and 6, a webbing winding device 10 according to an embodiment of the invention includes a frame 12, a spool 20, a webbing 22, a locking gear 24 serving as a locking portion, a main torsion shaft 32 constituting a force limiter mechanism 31 (in a broad sense, a component which is understood as a 'first load application (imparting) member'), a trigger wire 40 (in a broad sense, a component which is understood as a 'trigger member'), a sub-torsion shaft 44 (in a broad sense, a component which is understood as a 'second load application (imparting) member'), and a clutch mechanism 52, and a switching mechanism 120.

As illustrated in FIG. 1, the frame 12 includes a plate-like back plate 14 which is fixed to a vehicle body. Leg pieces 16 and 18 extend in the substantially perpendicular direction from both end portions of the back plate 14 in the width direction, and the frame 12 is formed in a substantially recess shape in the top view. Furthermore, an existing locking mechanism (not shown in the drawings) is attached to the outside of the leg piece 18.

The spool 20 is formed in a cylindrical shape which has a penetration hole 21 penetrating in the axial direction, and is disposed between the leg piece 16 and the leg piece 18 of the frame 12. The spool 20 is disposed so that the axial direction thereof becomes the opposing direction of the leg piece 16 and the leg piece 18, and is rotatably supported to the frame 12 through the main torsion shaft 32, the sub-torsion shaft 44, and the like to be described later.

The webbing 22 is configured to be mounted on the body of the passenger, and the base end portion as one end portion thereof in the longitudinal direction is caught (anchored) to the spool 20. When the spool 20 rotates in the winding direction (the direction indicated by the arrow A of FIG. 1 and the like) which corresponds to one side in the rotation direction, the webbing 22 is wound thereon from the base end side thereof so as to be accommodated.

The locking gear 24 is disposed at one side in the axial direction of the spool 20 so as to be coaxial with the spool 20. A gear portion 26 is formed in the outer peripheral portion of the locking gear 24. Further, in the shaft center portion of the locking gear 24, a penetration hole 28 is formed which penetrates in the axial direction, and in the inner peripheral portion of the penetration hole 28, a spline-like subject engagement portion 30 is formed.

In an emergency of a vehicle (at a predetermined moment such as rapid deceleration), the locking mechanism is operated by detecting a state where the acceleration of the vehicle (especially, the reducing acceleration) is a predetermined acceleration or more or the pull-out acceleration of the webbing 22 from the spool 20 is a specific acceleration or more, the locking member (not shown in the drawings) of the locking mechanism engages with a gear portion 26 of the locking gear 24, so that the rotation of the locking gear 24 in the pull-out direction (in the direction indicated by the arrow B of FIG. 1) is inhibited (locked).

The main torsion shaft 32 is disposed so as to be coaxial with the spool 20 and the locking gear 24, and is inserted into each of the penetration hole 21 of the spool 20 and the penetration hole 28 of the locking gear 24. As for the main torsion shaft 32, the center portion thereof in the longitudinal direction is provided (formed) with a spline-like first engagement portion 34, and the tip end portion thereof is provided (formed) with a spline-like second engagement portion 36.

By that the first engagement portion 34 engages with the subject engagement portion (engaged portion) 30 of the locking gear 24, the main torsion shaft 32 is fixed to the locking gear 24 so as to be rotatable together. Further, when the second engagement portion 36 engages with a subject engagement portion (engaged portion) (not shown in the drawings) formed in the axial intermediate portion of the inner peripheral portion of the spool 20, the main torsion shaft 32 is fixed to the spool 20 so as to be rotatable together.

The portion between the first engagement portion 34 and the second engagement portion 36 in the main torsion shaft 32 is configured as a first energy absorbing portion 38 which absorbs the kinetic energy of the passenger, stretching of the webbing 22 as described below.

A base end portion 40A of the trigger wire 40 is inserted into a hole portion 29 which is formed at the outside in the radial direction of the locking gear 24 in relation to the penetration hole 28 so as to be caught to the locking gear 24. On the other hand, the tip end side of the trigger wire 40 in relation to the base end portion 40A is inserted into a hole portion 42 which is formed in the spool 20 so as to be parallel to the penetration hole 21, and a tip end portion 40B protrudes from the spool 20 toward the other side in the axial direction.

The sub-torsion shaft 44 is disposed so as to be coaxial with the main torsion shaft 32, and the base end side in relation to the center portion in the longitudinal direction is inserted into the penetration hole 21 of the spool 20. On the other hand, the tip end side of the sub-torsion shaft 44 in relation to the center portion thereof in the longitudinal direction protrudes from the spool 20 toward the other side in the axial direction.

As for the sub-torsion shaft 44, at least a part of the base end portion is provided (formed) with a spline-like first engagement portion 46, and the tip end portion is provided (formed) with a spline-like second engagement portion 48. The first engagement portion 46 engages with a subject engagement portion (engaged portion) (not shown in the drawings) formed in the axial intermediate portion of the inner peripheral portion of the spool 20, so that the sub-torsion shaft 44 is fixed to the spool 20 so as to be rotatable together.

Further, the portion between the first engagement portion 46 and the second engagement portion 48 in the sub-torsion shaft 44 is configured as a second energy absorbing portion 50 which absorbs the kinetic energy of the passenger stretching of the webbing 22 as described below.

Figure 4A:
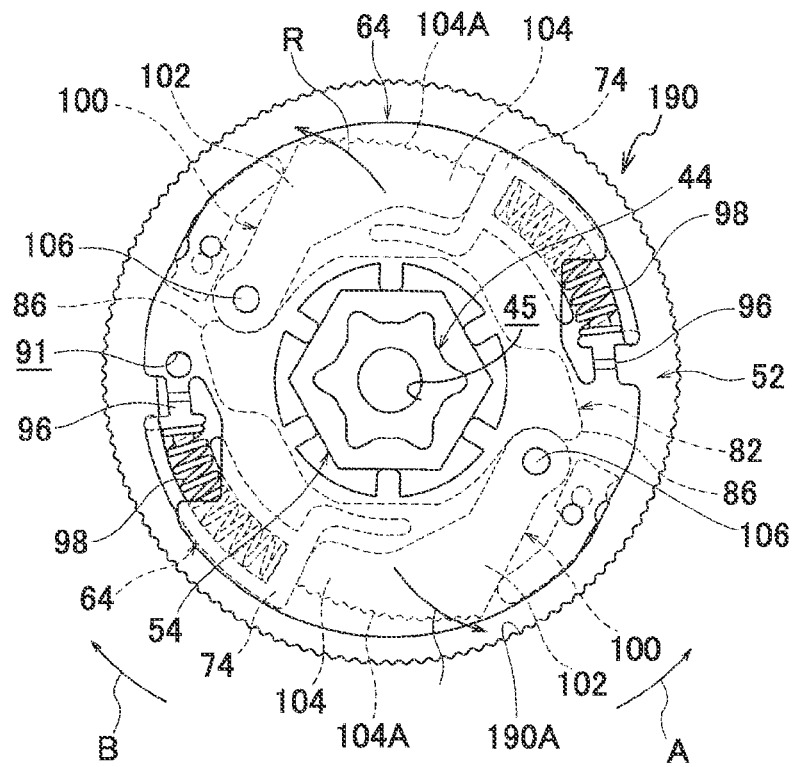
FIG. 4A is a diagram illustrating a state where a clutch plate of the clutch mechanism illustrated in FIG. 3 starts to rotate toward a locking ring and FIG. 4B is a diagram illustrating a state where the clutch plate meshes with the locking ring.
Figure 4B:
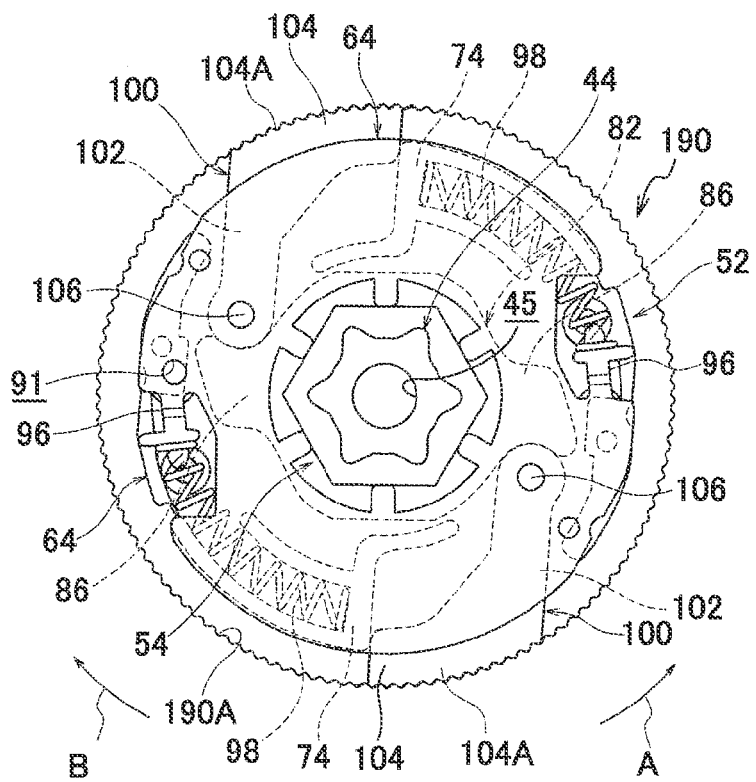
Figure 5:
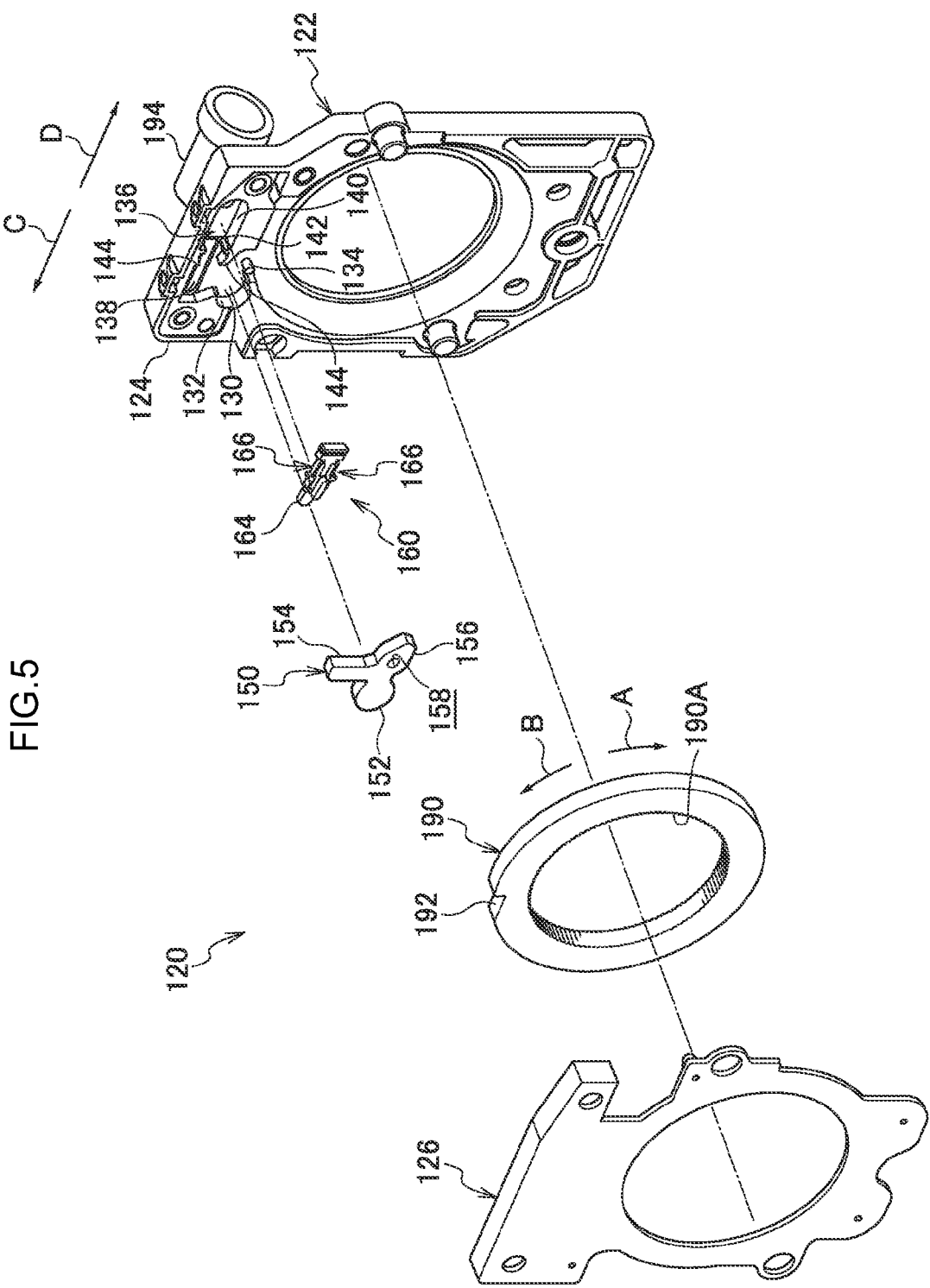
FIG. 5 is an exploded perspective view illustrating a configuration of a switching mechanism which is a constituting member of the webbing winding device illustrated in FIG. 1.

As illustrated in FIGS. 1 and 2, the clutch mechanism 52 includes a sleeve 54, a clutch guide 64, a clutch base 82, a clutch cover 88, a pair of clutch plates 100, a screw 108, and a pair of coil springs 98. Furthermore, FIG. 4A illustrates a state where the clutch mechanism 52 is being operated and FIG. 4B illustrates a state where the operation of the clutch mechanism 52 is completed.

The sleeve 54 is disposed so as to be coaxial with the sub-torsion shaft 44. The shaft center portion of the sleeve 54 is provided (formed) with a penetration hole 56 which penetrates in the axial direction, and the sub-torsion shaft 44 is loosely inserted into the penetration hole 56. Further, the tip end side of the inner peripheral portion of the sleeve 54 is provided (formed) with a spline-like subject engagement portion (engaged portion) 58, and the second engagement portion 48 of the sub-torsion shaft 44 engages with the subject engagement portion 58, so that the sleeve 54 is fixed to the sub-torsion shaft 44 so as to be rotatable together.

Further, the base end side of the sleeve 54 is formed as a support portion 60 having a circular external shape, and the tip end side of the sleeve 54 in relation to the support portion 60 is formed as a fitting portion 62 having a hexagonal external shape.

The clutch guide 64 is formed of a resin, and is formed in an annular shape which has a penetration hole 66 penetrating in the axial direction. The support portion 60 is inserted into the penetration hole 66, so that the clutch guide 64 is supported to the sleeve 54 so as to be relatively rotatable.

Figure 3:
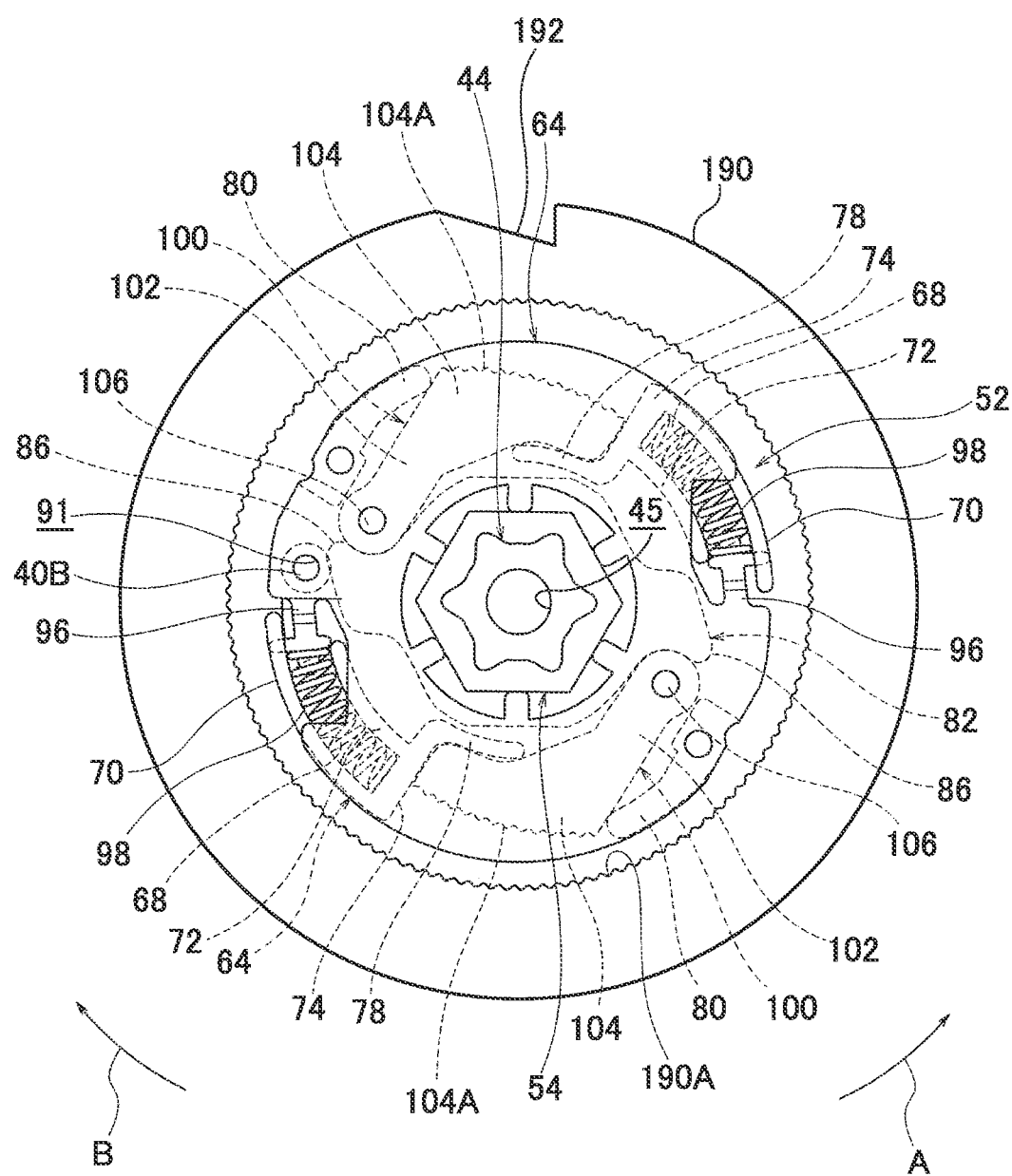
FIG. 3 is a diagram when the clutch mechanism which is the constituting member of the webbing winding device illustrated in FIG. 1 is seen from the side opposite to a spool.

As illustrated in FIG. 3, a pair of coil spring accommodation portions 68 which accommodates coil springs 98 is formed at two positions of the clutch guide 64 in the circumferential direction. The coil spring accommodation portions 68 are formed so as to be point-symmetrical to each other about the center portion of the clutch guide 64, and each is formed in a substantially U-shape having an outer wall portion 70 and an inner wall portion 72 which extend in the circumferential direction of the clutch guide 64 and a connection wall portion 74 which extends in the radial direction of the clutch guide 64 so as to connect the respective end portions of the outer wall portion 70 and the inner wall portion 72 to each other.

Further, in the clutch guide 64, a pair of clutch plate accommodation portions 76 accommodating a clutch plate 100 is formed so as to be adjacent to respective coil spring accommodation portions 68. The clutch plate accommodation portion 76 is provided (formed) with a first support wall portion 78 which extends from the connection wall portion 74 toward the opposite side to the inner wall portion 72 and a second support wall portion 80 which is apart from the connection wall portion 74 at the opposite side to the outer wall portion 70 with respect to the connection wall portion 74.

The clutch base 82 has a structure to include a hexagonal annular subject fitting portion (fitted portion) 84. The fitting portion 62 of the sleeve 54 is fitted into (press-inserted) into the subject fitting portion 84, so that the clutch base 82 is fixed to the sleeve 54 so as to be rotatable together. Furthermore, in other embodiments, the sleeve 54 and the clutch base 82 may be integrated with each other. Further, the clutch base 82 is provided (formed) with a pair of catching portions (anchoring portions) 86 which protrudes outward from the subject fitting portion 84. The catching portion 86 is caught (anchored) to a base end portion of an arm portion 102 formed in the clutch plate 100 to be described later.

The clutch cover 88 is disposed so as to be coaxial with the sleeve 54, and is disposed so as to face the clutch guide 64 at the opposite side to the spool 20 with respect to the clutch guide 64. The clutch cover 88 is formed in an annular shape which has a penetration hole 90 penetrating in the axial direction, and the inner peripheral portion is provided (formed) with plural fitting claws 92 which protrude inward in the radial direction. The fitting portion 62 of the sleeve 54 is inserted into the penetration hole 90, and plural fitting claws 92 are fitted to the fitting portion 62, so that the clutch cover 88 is fixed to the sleeve 54 and further the sub-torsion shaft 44 so as to be rotatable together. Further, as for the clutch cover 88, cross-shaped claws 96 to be described later engage with the clutch guide 64 in the circumferential direction, and the clutch guide 64 is relatively rotatable with respect to the clutch cover 88 between the operation position illustrated in FIG. 4B and the non-operation position illustrated in FIG. 3.

Further, a notch portion 94 which is opened outward in the radial direction and is formed in a recess shape when seen from the axial direction is formed at each of two positions of the clutch cover 88 in the circumferential direction. Further, the clutch cover 88 is provided (formed) with the pair of cross-shaped claws 96 disposed inside the respective notch portions 94. The pair of cross-shaped claws 96 is formed so as to be point-symmetrical to each other about the center portion of the clutch cover 88. Further, the cross-shaped claw 96 is bent in a crank shape when seen from the radial direction of the clutch cover 88, and the tip end side thereof protrudes toward the clutch guide 64 in relation to the base end side thereof.

The tip end side of each cross-shaped claw 96 is provided with an inner protrusion portion which protrudes inward in the radial direction of the clutch guide 64, an outer protrusion portion which protrudes outward in the radial direction of the clutch guide 64, and a circumferential protrusion portion which protrudes toward one side in the circumferential direction of the clutch guide 64 (the winding direction), and the tip end side of each cross-shaped claw 96 is formed in a cross-shape when seen from the axial direction of the clutch guide 64.

The clutch plates 100 are disposed between the clutch cover 88 and the clutch guide 64. The clutch plate 100 includes an arm portion 102 and a circular-arc portion 104 which is formed in the tip end portion of the arm portion 102. The base end portion of the arm portion 102 is provided (formed) with a rotary shaft 106 which protrudes toward the clutch cover 88 side and extends along the axial direction of the sub-torsion shaft 44. By that the rotary shaft 106 is inserted into a hole portion 89 formed in the clutch cover 88, the clutch plate 100 is rotatably supported to the clutch cover 88. Further, the outer peripheral portion of the circular-arc portion 104 (the tip end portion of the clutch plate 100) is provided (formed) with a spur-like knurling tooth 104A.

The screw 108 includes a screw portion 110 and a push portion 112 which is larger in diameter than the screw portion 110. The screw portion 110 is threaded into a screw hole 45 formed in the tip end portion of the sub-torsion shaft 44, so that the screw 108 is fixed to the tip end portion of the sub-torsion shaft 44. Further, in a state where the screw 108 is fixed to the tip end portion of the sub-torsion shaft 44 in this way, the push portion 112 abuts (comes into contact with) the tip end portion of the sleeve 54. Accordingly, the movement of the sleeve 54 with respect to the sub-torsion shaft 44 in the separation direction is restricted. Furthermore, in this state, the movement of the clutch guide 64 in the axial direction is restricted by the clutch cover 88 and the spool 20.

Further, the clutch guide 64 and the clutch cover 88 are respectively provided (formed) with hole portions 65 and 91. The hole portions 65 and 91 are formed so as to face each other in a state where the clutch guide 64 is disposed at the non-operation position with respect to the clutch cover 88, and the tip end portion 40B of the trigger wire 40 is inserted into each of the hole portions 65 and 91. Accordingly, the relative rotation of the clutch guide 64 with respect to the spool 20 and the clutch cover 88 is restricted in a state where the clutch guide is disposed at the non-operation position (the clutch guide 64 is restrained at the non-operation position.).

Furthermore, as described above, in a state where the clutch guide 64 is restrained at the non-operation position, each cross-shaped claw 96 of the clutch cover 88 is positioned near the opening portion of each coil spring accommodation portion 68 of the clutch guide 64. Then, the circumferential protrusion portion of each cross-shaped claw 96 is inserted into the coil spring 98 from one axial end portion of the coil spring 98 accommodated in each coil spring accommodation portion 68, and the inner protrusion portion and the outer protrusion portion of each cross-shaped claw 96 come into contact with the one axial end portion of the coil spring 98. Accordingly, the one axial end portion of the coil spring 98 is caught to each cross-shaped claw 96. Further, the other axial end portion of the coil spring 98 is caught to the connection wall portion 74 (see FIG. 3) of the coil spring accommodation portion 68.

Further, in this state, a gap between the cross-shaped claw 96 and the connection wall portion 74 becomes shorter than the entire length of the coil spring 98 in the free (normal) state thereof, so that the coil spring 98 is in compressed state. Accordingly, a biasing force is applied with respect to the clutch guide 64 in the winding direction, so that the clutch guide 64 is biased toward the operation position.

On the other hand, in this state, a gap between the hole portion 89 of the clutch cover 88 (the rotary shaft 106 of the clutch plate 100) and the connection wall portion 74 is sufficiently ensured, and the clutch plate 100 is accommodated in the clutch plate accommodation portion 76 so that the knurling tooth 104A is positioned at the inside in relation to the outer peripheral portion of the clutch guide 64. Further, in this state, the connection wall portion 74 comes into contact with the tip end of the circular-arc portion 104.

As illustrated in FIGS. 5 to 9, the switching mechanism 120 includes a box-like body 122. Inside the body 122, the side of the leg piece 16 of the frame 12 is opened, and the body 122 is fixed to the outside of the leg piece 16. A substantially disk-like locking ring 190 is rotatably supported to the inside of the body 122, and the locking ring 190 is disposed so as to be coaxial with the clutch mechanism 52 at the outer peripheral side of the clutch mechanism 52. Further, the inner peripheral portion of the locking ring 190 is provided (formed) with a spur-like knurling tooth 190A. Furthermore, the outer peripheral portion of the locking ring 190 is provided (formed) with a locking hole 192 in penetration manner having a substantially triangular cross section, and the locking hole 192 is opened outward in the radial direction of the locking ring 190.

In the upper portion of the body 122, a casing portion 124 is provided which serves as an accommodation portion accommodating a pawl 150, a piston 160, and a gas generator 194 to be described later. Further, a substantially plate-like seat 126 is provided in the body 122 on the side of the leg piece 16, and the seat 126 closes the opening portion of the body 122.

A casing portion 124 is provided with a recess portion 130 which is opened toward the leg piece 16 side. The recess portion 130 is provided (formed) with a support portion 132 which has a substantially C-shaped cross section, and the support portion 132 rotatably supports a shaft portion 152 of the pawl 150 to be described later. Further, in the casing portion 124, a columnar share pin 134 is integrated with the inside of the recess portion 130, and the share pin 134 protrudes toward the leg piece 16 side.

Figure 11A:
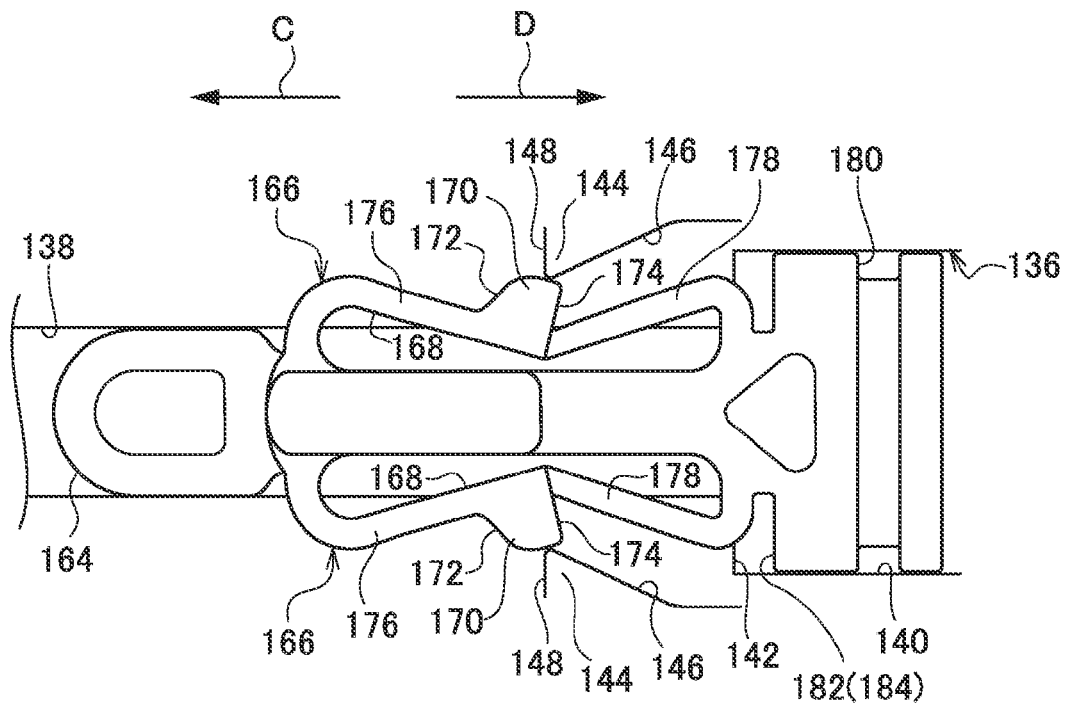
FIG. 11A is a side view when seen from the side opposite to the spool, which illustrates a state where the piston of the switching mechanism illustrated in FIG. 5 moves from a standby position toward one side in the movement direction and an arm portion of the piston is elastically deformed.
Figure 11B:
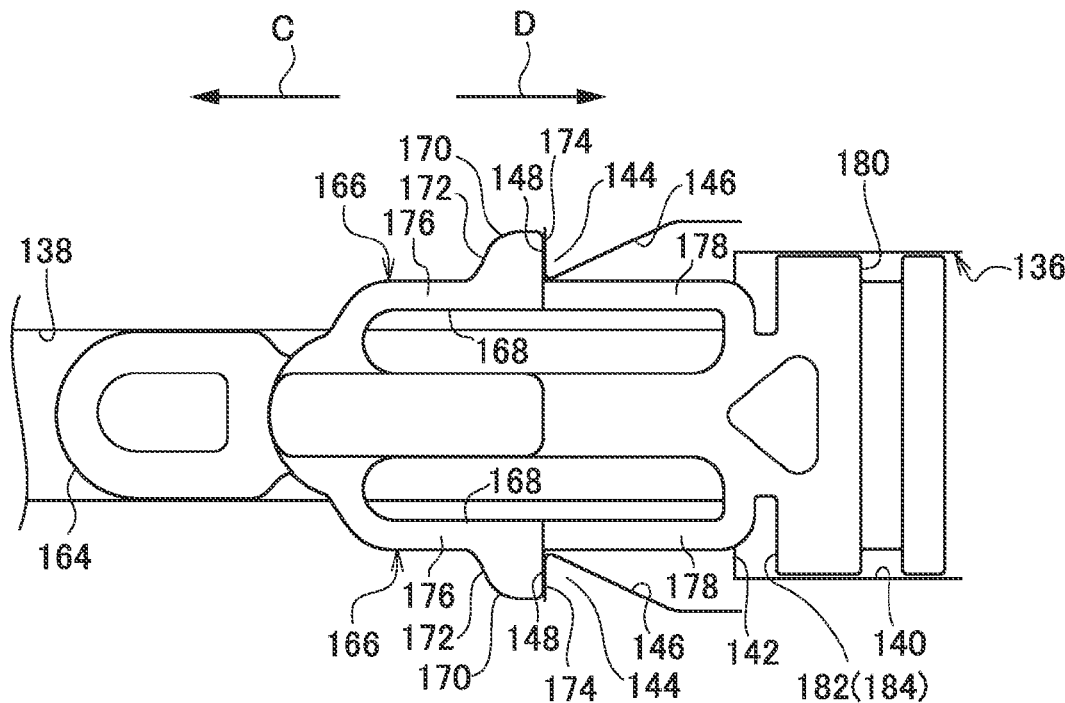
FIG. 11B is a side view when seen from the side opposite to the spool, which illustrates a state where the piston further moves toward one side in the movement direction from the state of FIG. 11A and an engagement claw portion of the piston returns to the initial state.

A piston accommodation portion 136 is provided inside the recess portion 130. The piston accommodation portion 136 is formed in a recess shape so as to be opened toward the leg piece 16 and communicate with the recess portion 130. Further, the piston accommodation portion 136 extends in the directions indicated by the arrow C and the arrow D of FIG. 7 when seen from the leg piece 16, where the portion at one side in the longitudinal direction of the piston accommodation portion 136 (toward the direction indicated by the arrow C of FIG. 7) is as a subject guide portion (guided portion) 138, and the portion at the other side in the longitudinal direction of the piston accommodation portion 136 (toward the direction indicated by the arrow D of FIG. 7) is as a cylinder portion 140. The cylinder portion 140 is provided with a contact surface 142, and the contact surface 142 is disposed along the direction perpendicular to the longitudinal direction of the piston accommodation portion 136 (see FIGS. 11A and 11B).

Further, the recess portion 130 is provided with a pair of subject engagement portions (engaged portions) 144 having a substantially triangular cross section, and the subject engagement portions 144 are disposed so as to face each other in the vertical direction. Each subject engagement portion 144 includes a slope surface 146, and the slope surfaces 146 are disposed so as to be inclined in a direction moving away from each other as going toward the other side in the longitudinal direction of the piston accommodation portion 136. Further, the subject engagement portion 144 includes a subject engagement surface (engaged surface) 148, and the subject engagement surface 148 is disposed along the vertical direction.

The substantially plate-like pawl 150 is accommodated inside the recess portion 130 of the casing portion 124. In the pawl 150, the shaft portion 152 having a substantially circular cross section is provided at the portion near the support portion 132 of the recess portion 130, and the shaft portion 152 is rotatably supported to the support portion 132. Further, the pawl 150 includes a substantially L-shaped arm portion 154. The base end portion of the arm portion 154 is provided with an engagement portion 156, and the tip end of the engagement portion 156 is disposed inside the locking hole 192 of the locking ring 190 (which is a position illustrated in FIG. 7, and this position is referred to as a 'lock position' as a first position) so as to engage with the locking ring 190. In addition, a catching (anchoring) hole 158 having a circular cross section is formed and penetrates the base end portion of the arm portion 154, and the share pin 134 is inserted through the catching hole 158, so that the rotation of the pawl 150 is restricted. Further, when the pawl 150 breaks the share pin 134 due to the rotational force acting on the pawl 150, the pawl 150 is rotated to a release position as a second position illustrated in FIG. 8.

Figure 7:
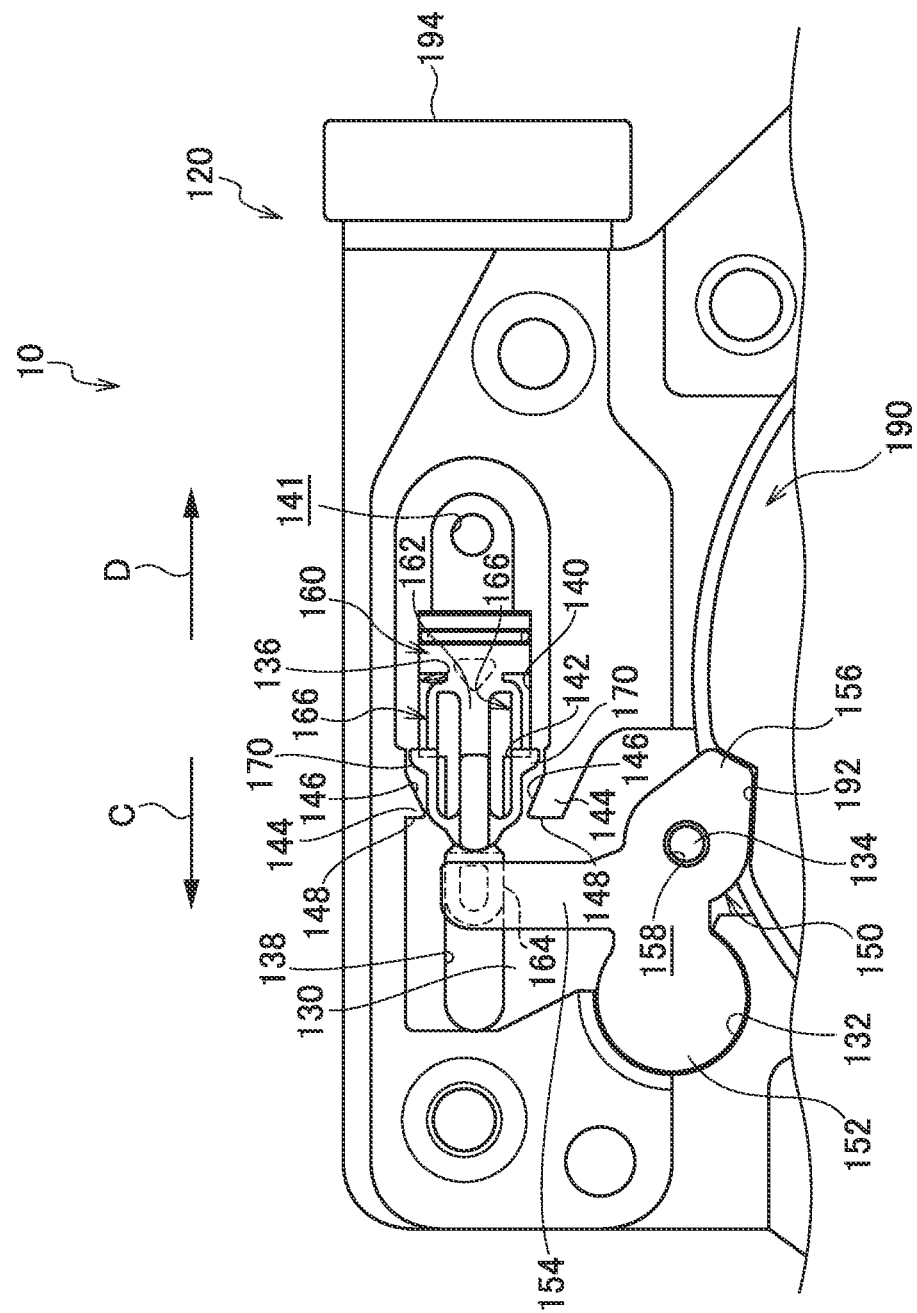
FIG. 7 is a side view when seen from the side opposite to the spool, which illustrates a state where a piston of the switching mechanism illustrated in FIG. 5 is disposed at a standby position and a pawl of the switching mechanism is disposed at a lock position.
Figure 10A:
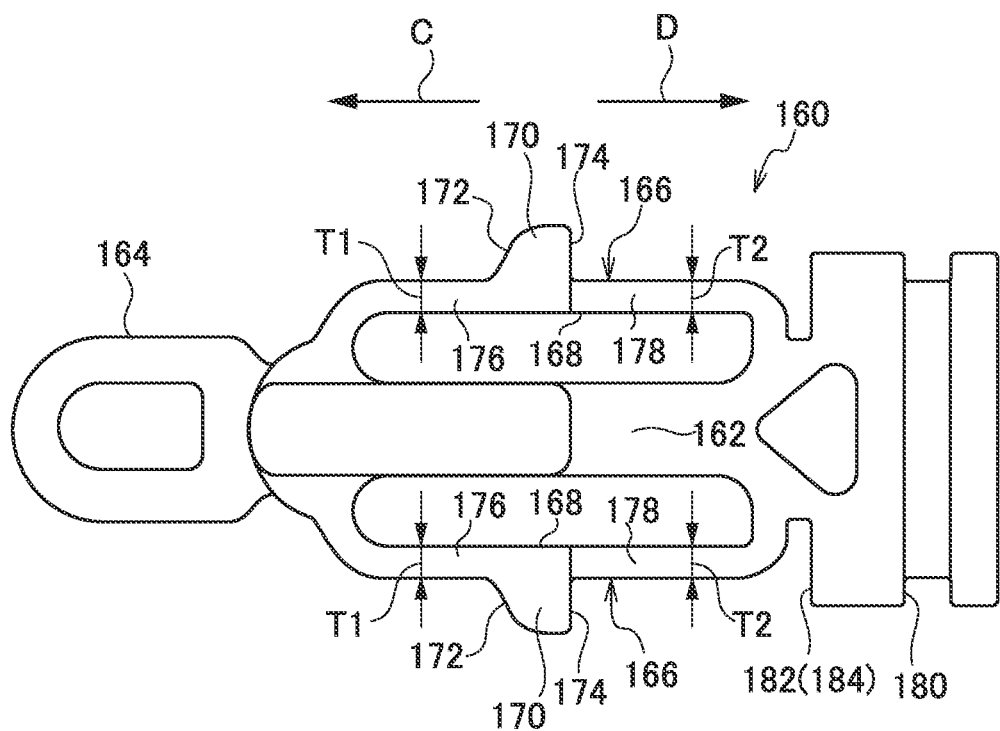
FIG. 10A is a side view when seen from the side opposite to the spool, which illustrates the piston of the switching mechanism illustrated in FIG. 5
Figure 10B:
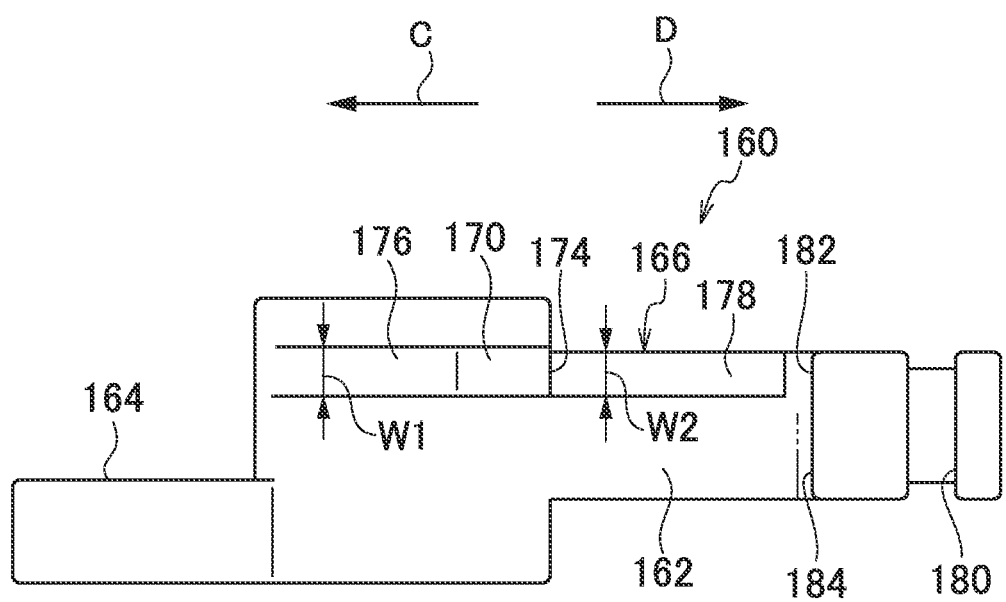
FIG. 10B is a side view when the piston of FIG. 10A is seen from the bottom side thereof.

The piston accommodation portion 136 accommodates the piston 160 formed of a resin so that the piston 160 is straightly movable in the directions indicated by the arrow C and the arrow D of FIG. 7. As illustrated in FIGS. 10A and 10B, the piston 160 includes a body portion 162 which is formed in a substantially elongated T-shape when seen from the leg piece 16, and the body portion 162 is disposed at the other side in the longitudinal direction (toward the direction indicated by the arrow D of FIG. 7) with respect to the tip end portion of the arm portion 154 of the pawl 150 (which is a position illustrated in FIG. 7, and this position is referred to as a 'standby position'). Further, a substantially track-like annular guide portion 164 is formed to be integrated with one side in the longitudinal direction of the body portion 162 (toward the direction indicated by the arrow C of FIG. 10), and the guide portion 164 protrudes from the body portion 162 toward one side in the longitudinal direction of the body portion 162. Further, the guide portion 164 is disposed inside the subject guide portion 138 of the piston accommodation portion 136, and when the piston 160 straightly moves, the guide portion 164 comes into contact with the inner peripheral portion of the subject guide portion 138, so that the straight movement direction of the piston 160 is guided.

A pair of engagement claw portions 166 serving as an engagement portion are provided at the subject engagement portions 144 sides of the body portion 162. The engagement claw portions 166 are disposed so as to face the subject engagement portions 144, and are integrated with the body portion 162. Further, the engagement claw portion 166 includes an arm portion 168 and a hook portion 170. The arm portion 168 extends along the movement direction of the piston 160, and is bent toward the body portion 162 at both end portions thereof in the longitudinal direction so as to be connected to the body portion 162. The hook portion 170 is provided at the intermediate portion of the arm portion 168 in the longitudinal direction, and protrudes from the arm portion 168 toward the subject engagement portion 144 side. Further, the hook portion 170 includes a sliding surface 172 which is formed in a substantially circular-arc shape and an engagement surface 174 which is formed along the direction perpendicular to the movement direction of the piston 160. Furthermore, the portion of the arm portion 168 at one side in the movement direction with respect to the hook portion 170 is as a first arm portion 176, and the portion of the arm portion 168 at the other side in the movement direction with respect to the hook portion 170 is as a second arm portion 178. The thickness T1 of the first arm portion 176 is set to be equal to the thickness T2 of the second arm portion 178, and the width W1 of the first arm portion 176 is set to be larger than the width W2 of the second arm portion 178.

The end portion of the body portion 162 at the other side in the longitudinal direction (toward the direction indicated by the arrow D of FIG. 10) is provided with a ring groove 180 having a recess-like cross section at the outer peripheral portion, and the ring groove 180 is formed along the circumferential direction of the piston 160. An O-ring (not shown in the drawings) is provided inside the ring groove 180, and a gap between the cylinder portion 140 of the piston accommodation portion 136 and the piston 160 is sealed by the O-ring.

Furthermore, at the end portion of the body portion 162 at the other side in the longitudinal direction, an end surface 182 is provided which faces the end portion of the arm portion 168 at the other side in the longitudinal direction, and the end surface 182 is disposed along the direction perpendicular to the movement direction of the piston 160. Further, a surface (the surface of the range indicated by the two-dotted chain line of FIG. 10B) which is offset with respect to the engagement claw portion 166 in the end surface 182 when seen from one side of the movement direction of the piston 160 (from the side of the arrow C of FIG. 10) is as a stopper surface 184 serving as a stopper portion, and the stopper surface 184 is configured to come into contact with (abut) the contact surface 142 of the piston accommodation portion 136.

Further, in the casing portion 124, a substantially columnar gas generator 194 (in a broad sense, a component which is understood as an 'operation unit') is built in the portion opposite to the leg piece 16 with respect to the piston accommodation portion 136, and the gas generator 194 communicates with the cylinder portion 140 of the piston accommodation portion 136 through a gas hole 141.

A control device (not shown in the drawings) of a vehicle is electrically connected to the gas generator 194, and when the gas generator 194 is operated by the control of the control device, the gas generator 194 generates a gas, and the gas is supplied to the cylinder portion 140 of the piston accommodation portion 136.

Further, the control device is electrically connected to a collision detecting unit (not shown in the drawings). The collision detecting unit predicts the collision of the vehicle through, for example, an acceleration sensor which detects the acceleration (especially rapid deceleration) of the vehicle or a distance measuring sensor which detects the distance up to the obstacle in front of the vehicle. Further, the collision detecting unit is configured to detect the collision of the vehicle in a manner such that the acceleration sensor detects the collision acceleration larger than or equal to a predetermined reference value.

Furthermore, the control device is electrically connected to a body shape detecting unit (not shown in the drawings), and the body shape detecting unit detects the body shape of the passenger sitting on a seat through, for example, a load sensor, a belt sensor, a seat position sensor. Specifically, the load sensor detects the load acting on the seat of the vehicle, and the body shape detecting unit detects the body shape of the passenger based on the detected load. Further, the belt sensor detects the pull-out amount of the webbing 22 from the spool 20, and the body shape detecting unit detects the body shape of the passenger based on the detected pull-out amount. Furthermore, the seat position sensor includes a position detecting sensor which detects the slide position in the front and rear direction of the seat of the vehicle or a camera sensor which is formed in the interior of the vehicle, and the body shape detecting unit detects the body shape of the passenger based on the position of the seat detected by the seat position sensor.

The above mentioned piston 160 is disposed at the standby position, and at this position, the engagement claw portion 166 of the piston 160 is not elastically deformed (hereinafter, this state is referred to as an 'initial state'). Further, the pawl 150 is disposed at the lock position.

Then, when the control device determines that the body shape of the passenger is less than a predetermined reference value based on the signal from the body shape detecting unit and the collision of the vehicle occurs based on the signal from the collision detection unit, the gas generator 194 is operated by the control device. Accordingly, a gas is supplied from the gas generator 194 into the cylinder portion 140 of the piston accommodation portion 136. When the gas is supplied into the cylinder portion 140 of the piston accommodation portion 136, the piston 160 is operated, so that it moves from the standby position toward one side in the movement direction (toward the direction indicated by the arrow C of FIG. 7). When the piston 160 moves toward one side in the movement direction, the sliding surface 172 of the hook portion 170 of the piston 160 slides on the slope surface 146 of the subject engagement portion 144, and the hook portion 170 is pushed (pressed) by the subject engagement portion 144 toward the body portion 162, so that the arm portion 168 is elastically deformed toward the body portion 162. Accordingly, when the hook portion 170 passes by the subject engagement portion 144, the movement of the piston 160 from the standby position toward one side in the movement direction is permitted.

Further, due to that the body portion 162 of the piston 160 presses the arm portion 154 of the pawl 150 when the piston 160 moves toward one side in the movement direction, a rotational force acts on the pawl 150. By that the pawl 150 breaks the share pin 134 due to the rotational force, the rotation of the pawl 150 is permitted, so that the pawl 150 rotates from the lock position toward the release position.

Figure 8:
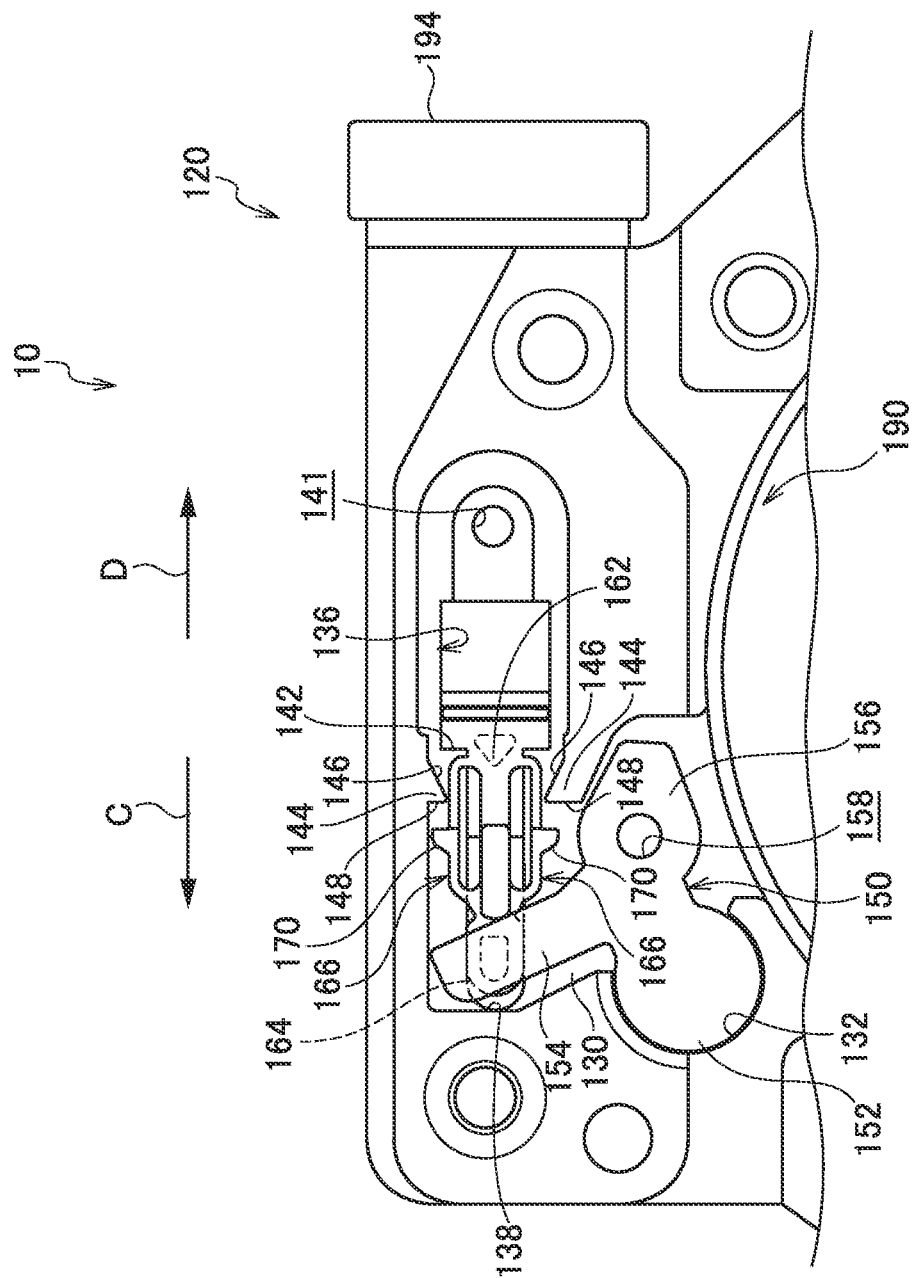
FIG. 8 is a side view when seen from the side opposite to the spool, which illustrates a state where the piston illustrated in FIG. 7 moves to a maximum movement position and the pawl is disposed at a release position.
Figure 9:
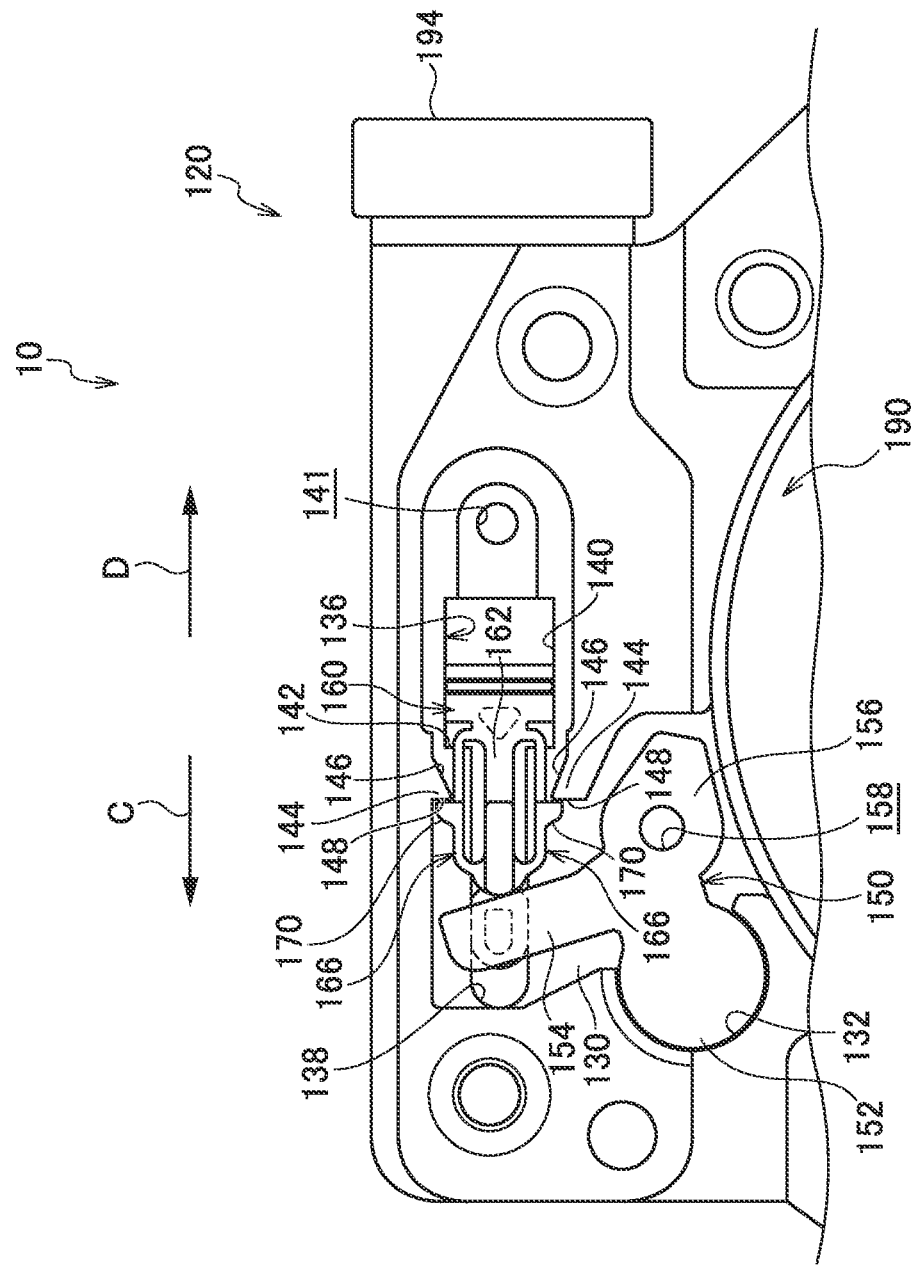
FIG. 9 is a side view when seen from the side opposite to the spool, which illustrates a state where the piston illustrated in FIG. 7 moves from the maximum movement position toward the other side in the movement direction, a hook portion of the piston engages with a subject engagement portion, and the pawl moves away from the locking ring.

Furthermore, the piston 160 is configured to move to a position where the stopper surface 184 of the piston 160 comes into contact with the contact surface 142 of the cylinder portion 140 (which is a position illustrated in FIG. 8, and hereinafter, this position is referred to as a 'maximum movement position').

Here, the webbing winding device 10 according to the embodiment is operated as below.

That is, the spool 20, the locking gear 24, the main torsion shaft 32, the sub-torsion shaft 44, and the clutch mechanism 52 (including the sleeve 54, the clutch base 82, the clutch plate 100, and the screw 108) are configured to be rotatable together in the winding direction and the pull-out direction.

When the webbing 22 is pulled out from the spool 20, the webbing 22 is mounted on the body of the passenger of the vehicle.

In a state where the webbing 22 is mounted on the body of the passenger of the vehicle, for example, when the vehicle is rapidly decelerated and the locking mechanism is operated, the rotation of the locking gear 24 in the pull-out direction is inhibited.

Accordingly, the rotation in the pull-out direction of the spool 20 connected to the locking gear 24 through the main torsion shaft 32 is restricted, and the pull-out of the webbing 22 from the spool 20 is restricted. Accordingly, the body of the passenger which is about to move in the front direction of the vehicle is restrained by the webbing 22.

Further, when the body of the passenger stretches the webbing 22 by the larger force in a state in which the rotation of the locking gear 24 in the pull-out direction is inhibited and the rotational force of the spool 20 in the pull-out direction based on the tensile force becomes larger than the anti-twisting load (the anti-deformation load) of the first energy absorbing portion 38 of the main torsion shaft 32, the force limiter mechanism 31 is operated, so that the rotation of the spool 20 in the pull-out direction with a load larger than or equal to the force limiter load (the anti-twisting load of the first energy absorbing portion 38) is permitted by the twisting (deformation) of the first energy absorbing portion 38.

Accordingly, by that the spool 20 rotates in the pull-out direction by the twisting of the first energy absorbing portion 38 so that the webbing 22 is pulled out from the spool 20, the load (the burden) applied from the webbing 22 to the chest of the passenger is reduced, and the kinetic energy of the passenger stretching of the webbing 22 is absorbed by the twisted amount of the first energy absorbing portion 38.

On the other hand, as described above, the state in which the spool 20 rotates in the pull-out direction with respect to the locking gear 24 corresponds to the state in which the locking gear 24 rotates in the winding direction with respect to the spool 20. Accordingly, when the locking gear 24 rotates in the winding direction with respect to the spool 20, the base end portion 40A of the trigger wire 40 moves in the circumferential direction of the main torsion shaft 32 while the tip end side of the trigger wire 40 in relation to the base end portion 40A thereof is inserted into the hole portion 42 of the spool 20, so that the tip end side of the trigger wire 40 in relation to the base end portion 40A thereof is stretched (pulled) toward the locking gear 24 side with respect to the hole portion 42.

Accordingly, the tip end portion 40B of the trigger wire 40 is pulled out of the hole portion 65 of the clutch guide 64 and the hole portion 91 of the clutch cover 88, so that the relative rotation inhibiting state of the clutch guide 64 with respect to the spool 20 and the clutch cover 88 is released.

Then, when the clutch guide 64 rotates from the non-operation position to the operation position due to the biasing force of the coil spring 98, the gap between the hole portion 89 of the clutch cover 88 (the rotary shaft 106 of the clutch plate 100) and the connection wall portion 74 of the clutch guide 64 is shortened, and the tip end of the circular-arc portion 104 of the clutch plate 100 is pressed (guided) in the tangential direction of the clutch guide 64 by the connection wall portion 74. Accordingly, the clutch plate 100 rotates toward the locking ring 190 (see the arrow R of FIG. 4A), and the knurling tooth 104A of the clutch plate 100 meshes with the knurling tooth 190A of the locking ring 190 (the state illustrated in FIG. 4B). Accordingly, the clutch plate 100 and the locking ring 190 are connected to each other. Further, at this time, the catching portion 86 formed in the clutch base 82 presses the base end portion of the arm portion 102 of the clutch plate 100 in the pull-out direction, so that the clutch plate 100 is pressed against the locking ring 190, and hence the connection state therebetween is maintained. Accordingly, the locking ring 190 is about to rotate in the pull-out direction along with the rotation of the clutch mechanism 52 (the sleeve 54, the clutch base 82, and the clutch plate 100) in the pull-out direction.

Further, the control device determines whether the body shape of the passenger is larger than or equal to a predetermined reference value based on the signal from the body shape detecting unit, and determines whether the collision of the vehicle occurs based on the signal from the collision detection unit. Then, since the gas generator 194 is not operated when the control device determines that the body shape of the passenger is larger than or equal to a predetermined reference value, the engagement portion 156 of the pawl 150 is disposed at the lock position so as to engage with the locking hole 192 of the locking ring 190. For this reason, since the rotation of the locking ring 190 in the pull-out direction is locked (inhibited), the rotation of the clutch mechanism 52 (the sleeve 54, the clutch base 82, and the clutch plate 100) in the pull-out direction is inhibited.

Then, in a state where the rotation of the sleeve 54 in the pull-out direction is inhibited, the body of the passenger stretches the webbing 22 by the larger force. Then, when the rotational force of the spool 20 in the pull-out direction based on the tensile force becomes larger than the sum of the anti-twisting load (the anti-deformation load) of the first energy absorbing portion 38 of the main torsion shaft 32 and the anti-twisting load (the anti-deformation load) of the second energy absorbing portion 50 of the sub-torsion shaft 44, the rotation of the spool 20 in the pull-out direction with the load larger than or equal to the force limiter load (the sum of the anti-twisting load of the first energy absorbing portion 38 and the anti-twisting load of the second energy absorbing portion 50) is permitted due to the twisting (deformation) of the first energy absorbing portion 38 and the second energy absorbing portion 50.

Accordingly, by that the spool 20 rotates in the pull-out direction due to the twisting of the first energy absorbing portion 38 and the second energy absorbing portion 50 so that the webbing 22 is pulled out from the spool 20, the load (the burden) applied from the webbing 22 to the chest of the passenger is reduced, and the kinetic energy of the passenger stretching of the webbing 22 is absorbed by the twisted amount of the first energy absorbing portion 38 and the second energy absorbing portion 50.

On the other hand, when the control device determines that the body shape of the passenger is less than a predetermined reference value based on the signal from the body shape detecting unit and the collision of the vehicle occurs based on the signal of the collision detection unit, the gas generator 194 is operated by the control of the control device.

When the gas generator 194 is operated, a gas is supplied from the gas generator 194 into the cylinder portion 140 of the piston accommodation portion 136. When the gas is supplied into the cylinder portion 140, the piston 160 moves from the standby position toward one side in the movement direction, and the sliding surface 172 of the hook portion 170 of the piston 160 comes into contact with the slope surface 146 of the subject engagement portion 144 so as to slide on the slope surface 146. At this time, the hook portion 170 is pressed against toward the body portion 162 side by the subject engagement portion 144, so that the arm portion 168 is elastically deformed toward the body portion 162 (see FIG. 11A).

When the piston 160 further moves toward one side in the movement direction, a boundary portion between the engagement surface 174 and the sliding surface 172 of the hook portion 170 reaches a boundary portion between the subject engagement surface 148 and the slope surface 146 of the subject engagement portion 144, so that the elastic deformation amount of the arm portion 168 becomes maximal. When the piston 160 moves further toward one side in the movement direction from this state, the hook portion 170 moves away from the subject engagement portion 144, so that the pressing (pushing) from the subject engagement portion 144 toward the hook portion 170 is released, so that the arm portion 168 (the engagement claw portion 166) returns to the initial state, and the engagement surface 174 of the hook portion 170 is disposed so as to face the subject engagement surface 148 of the subject engagement portion 144 (see FIG. 11B). Accordingly, the hook portion 170 passes by the subject engagement portion 144, so that the movement of the piston 160 toward one side in the movement direction is permitted. Then, when the piston 160 moves further toward one side in the movement direction so as to reach the maximum movement position, the stopper surface 184 of the piston 160 comes into contact with the contact surface 142 of the piston accommodation portion 136, so that the piston 160 stops at the maximum movement position.

Further, when the piston 160 moves from the standby position toward one side in the movement direction, the body portion 162 of the piston 160 presses the arm portion 154 of the pawl 150. For this reason, a rotational force acts on the pawl 150 about the shaft portion 152. Due to the rotational force, the inner peripheral portion of the catching hole 158 of the pawl 150 comes into contact with the share pin 134 and breaks the share pin 134, so that the rotation about the shaft portion 152 of the pawl 150 is permitted, and hence the pawl 150 rotates from the lock position to the release position. Accordingly, the engagement portion 156 of the pawl 150 moves away from the locking hole 192 of the locking ring 190, and the rotation of the locking ring 190 in the pull-out direction is permitted, so that the locking ring 190 is rotatable in the pull-out direction together with the clutch mechanism 52 (the sleeve 54, the clutch base 82, and the clutch plate 100) and the spool 20. For this reason, since no twisting occurs in the second energy absorbing portion 50, the rotation of the spool 20 in the pull-out direction with the load larger than or equal to the force limiter load (the anti-twisting load of the first energy absorbing portion 38) is permitted due to the twisting (deformation) of the first energy absorbing portion 38 (see FIG. 8).

That is, in a case in which the body shape of the passenger is larger than or equal to a predetermined reference value, the force limiter load becomes the sum of the anti-twisting load of the first energy absorbing portion 38 and the anti-twisting load of the second energy absorbing portion 50, so that the load value of the force limiter load becomes a high load. On the other hand, in a case in which the body shape of the passenger is less than a predetermined reference value and the collision of the vehicle is detected, the force limiter load becomes the anti-twisting load of the first energy absorbing portion 38, so that the load value of the force limiter load becomes a low load. For this reason, the passenger can be appropriately protected in accordance with the shape of the passenger.

Here, when the piston 160 moves to the maximum movement position, the piston 160 may move from the maximum movement position toward the other side in the movement direction (toward the standby position) due to the reaction. In this case, the engagement surface 174 of the hook portion 170 comes into contact with (abuts) the subject engagement surface 148 of the subject engagement portion 144, so that the movement of the piston 160 toward the other side in the movement direction is restricted (see FIG. 9). Accordingly, the piston 160 is prevented from returning to the standby position, and the pawl 150 is prevented from returning from the release position to the lock position. For this reason, it is possible to maintain that the engagement portion 156 of the pawl 150 is away from the locking hole 192 of the locking ring 190 and the state in which the rotation of the locking ring 190 in the pull-out direction is permitted is maintained. Accordingly, after the piston 160 moves from the standby position to the maximum movement position, the piston 160 is prevented from returning to the standby position, and the load value of the force limiter load is prevented from being changed.

Further, the piston 160 is provided with the engagement claw portions 166, and the engagement claw portion 166 includes the arm portion 168 and the hook portion 170. Due to the elastic deformation of the arm portion 168, the movement of the piston 160 toward one side in the movement direction is permitted, and due to the engagement of the hook portion 170 with the subject engagement portion 144, the movement of the piston 160 toward the other side in the movement direction is restricted. Accordingly, the piston 160 can be prevented from returning to the standby position with a simple configuration.

Further, as described above, the piston 160 is provided with the stopper surface 184, and when the piston 160 moves to the maximum movement position, the stopper surface 184 comes into contact with the contact surface 142 of the piston accommodation portion 136, so that the movement of the piston 160 toward one side in the movement direction at the maximum movement position is restricted. For this reason, when the piston 160 moves to the maximum movement position, the movement of the piston 160 is stopped by the stopper surface 184. Furthermore, the stopper surface 184 is disposed so as to be offset from the engagement claw portion 166 when seen from one side of the movement direction of the piston 160 (one side in the longitudinal direction). For this reason, the contact surface 142 which is configured to come into contact with the stopper surface 184 is disposed so as to be offset from the engagement claw portion 166. Accordingly, when the piston 160 moves from the standby position to the maximum movement position, the engagement claw portion 166 does not interfere with the contact surface 142. Accordingly, the piston 160 can be provided with the stopper surface 184 which stops the piston 160 at the maximum movement position without affecting the movement of the engagement claw portion 166.

Furthermore, the arm portion 168 of the engagement claw portion 166 extends along the movement direction of the piston 160 between the body portion 162 of the piston 160 and the subject engagement portion 144, and the hook portion 170 of the engagement claw portion 166 is provided at the intermediate portion of the arm portion 168 in the longitudinal direction. Further, both end portions of the arm portion 168 in the longitudinal direction are connected to the body portion 162.

For this reason, the engagement claw portion 166 is structured as a both-end support beam. Accordingly, when the arm portion 168 is elastically deformed, the arm portion 168 is displaced, at the portion of the hook portion 170, in a direction (vertical direction) substantially perpendicular to the extension direction of the arm portion 168, the deformation region of the arm portion 168 decreases. That is, for example, in a case in which the engagement claw portion 166 is structured as a cantilever support beam, the hook portion 170 is displaced so as to draw a circular-arc trace about one end portion of the arm portion 168 in the longitudinal direction as a fulcrum. Accordingly, compared to this case, the deformation region of the arm portion 168 can be decreased.

Further, the piston 160 is formed of a resin, and both end portions of the arm portion 168 in the longitudinal direction are connected to the body portion 162. For this reason, the arm portion 168 is not opened. Accordingly, the arm portion 168 can be stably molded compared to a case where the arm portion 168 is opened. That is, if one end portion of both end portions of the arm portion 168 in the longitudinal direction is not connected to the body portion 162, the arm portion 168 is opened. Accordingly, when the piston 160 is formed of a resin in the "open" shape of the arm portion 168, the position of the hook portion 170 may be easily deviated due to the shrinkage or the like of the resin after molding. For this reason, there is a need to mold the piston 160 so that the position of the hook portion 170 is not deviated, and hence the molding precision in the piston 160 is needed.

Furthermore, for example, even when the pistons 160 are carried while plural pistons 160 are accommodated in an accommodation box, the arm portions 168 are suppressed from being intertwined with each other, so that the deformation of the arm portion 168 may be suppressed and an increase in cost of the piston 160 can be suppressed. That is, as described above, if one end portion of both end portions of the arm portion 168 in the longitudinal direction is not connected to the body portion 162, the arm portion 168 is opened. Accordingly, for example, when the pistons 160 are carried while plural pistons 160 are accommodated in the accommodation box, there is a possibility that the arm portions 168 may be intertwined with each other. For this reason, there is a need to increase the size of the piston 160 so as to increase the strength of the piston 160 itself and to provide a partition plate or the like for dividing the respective pistons 160 in the accommodation box so that the arm portions 168 are not intertwined with each other when carrying the pistons 160, which increases the cost of the piston 160.

First Modified Example

A first modified example has substantially the same configuration as that of the embodiment, but has the following differences.

Figure 12:
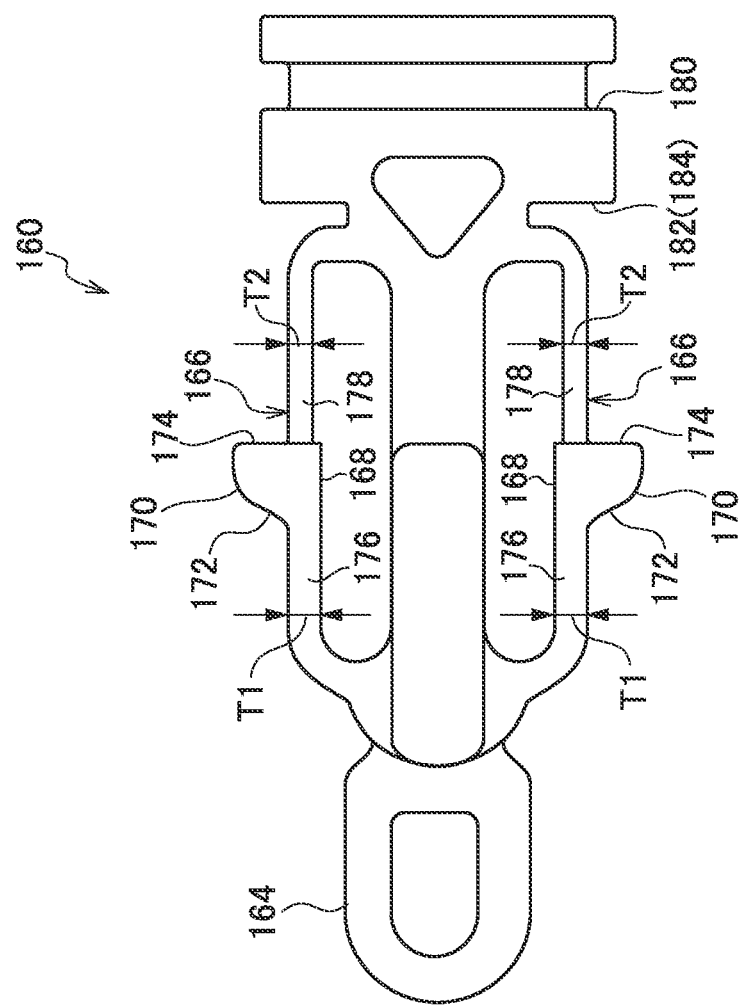
FIG. 12 is a side view when seen from the side opposite to the spool, which illustrates the piston of the switching mechanism as a modified example.

As illustrated in FIG. 12, in the first modified example, the thickness T2 of the second arm portion 178 of the arm portion 168 is set to be smaller than the thickness T1 of the first arm portion 176 of the arm portion 168. Further, the thickness T2 of the second arm portion 178 is set so that the second arm portion 178 is broken by the stress acting on the arm portion 168 when the elastic deformation amount of the arm portion 168 becomes maximal.

For this reason, when the piston 160 moves toward the one side in the movement direction and the boundary portion between the engagement surface 174 and the sliding surface 172 of the hook portion 170 passes by the boundary portion between the subject engagement surface 148 and the slope surface 146 of the subject engagement portion 144, a tensile force acts on the portion at the side of the body portion 162 of the second arm portion 178, so the second arm portion 178 is broken in the portion.

Further, when the piston 160 moves further toward the one side in the movement direction from this state, the hook portion 170 moves away from the subject engagement portion 144, and the pressing from the subject engagement portion 144 toward the hook portion 170 is released, so that the first arm portion 176 (the engagement claw portion 166) returns to the initial state, and the engagement surface 174 of the hook portion 170 is disposed so as to face the subject engagement surface 148 of the subject engagement portion 144. Accordingly, by that the hook portion 170 passes by the subject engagement portion 144, the movement of the piston 160 toward the one side in the movement direction is permitted. Furthermore, when the piston 160 reaches the maximum movement position, the stopper surface 184 of the piston 160 comes into contact with the contact surface 142 of the piston accommodation portion 136, so that the piston 160 stops at the maximum movement position.

Then, after the piston 160 moves to the maximum movement position and then when the piston 160 moves from the maximum movement position toward the other side in the movement direction (toward the standby position), the engagement surface 174 of the hook portion 170 comes into contact with the subject engagement surface 148 of the subject engagement portion 144, so that the movement of the piston 160 toward the other side in the movement direction is restricted.

With the above-described configuration, even in the first modified example, the same operations and effects as those of the embodiment can be obtained.

Further, in the first modified example, the mechanical strength of the second arm portion 178 is set to be smaller than the mechanical strength of the first arm portion 176, and the thickness T2 of the second arm portion 178 is set so that the second arm portion 178 is broken by the maximum deformation amount of the arm portion 168 when the arm portion 168 is elastically deformed. For this reason, the second arm portion 178 is broken when the hook portion 170 passes by the subject engagement portion 144, and the arm portion 168 (the engagement claw portion 166) is structured as a cantilever support beam after the second arm portion 178 is broken, so the hook portion 170 may be immediately returned to the initial state.

Furthermore, in the first modified example, the thickness T2 of the second arm portion 178 is set so that the second arm portion 178 is broken by the stress acting on the arm portion 168 when the elastic deformation amount of the arm portion 168 becomes maximal. Instead of this, the width W2 of the second arm portion 178 may be set so that the second arm portion 178 is broken by the stress acting on the arm portion 168 when the elastic deformation amount of the arm portion 168 becomes maximal.

Second Modified Example

A second modified example has substantially the same configuration as that of the first modified example, but has the following differences.

Figure 13:
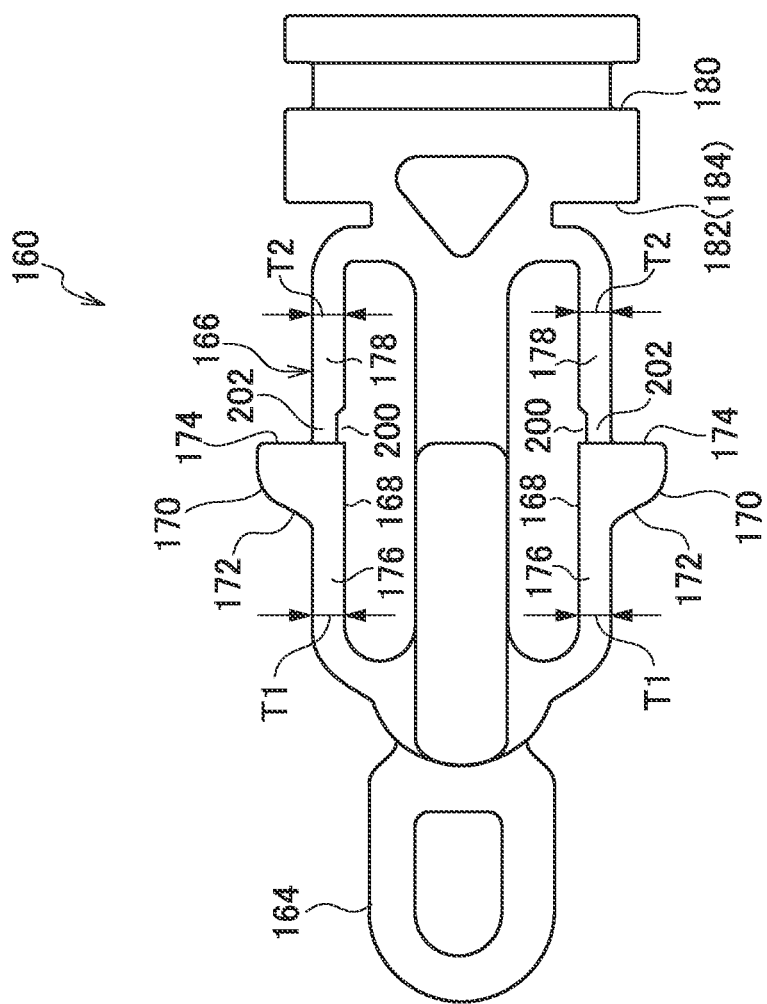
FIG. 13 is a side view when seen from the side opposite to the spool, which illustrates the piston of the switching mechanism as a modified example.

As illustrated in FIG. 13, in the second modified example, the portion at the side of the body portion 162 of each second arm portion 178 is provided with a groove portion 200 at the position at the side of (near) the hook portion 170. Further, the second arm portion 178 is provided (formed) with a fragile portion 202 which is adjacent to the groove portion 200. For this reason, in the second arm portion 178, the mechanical strength of the fragile portion 202 becomes smaller than the other portions. Accordingly, when the second arm portion 178 is elastically deformed, the second arm portion 178 is broken at the fragile portion 202 of the second arm portion 178. Accordingly, even in the second modified example, the same operations and effects as those of the first modified example may be obtained.

Further, in the second modified example, since the second arm portion 178 is broken at the fragile portion 202, the breaking position of the second arm portion 178 can be controlled.

Furthermore, in the second modified example, the thickness T2 of the second arm portion 178 of the arm portion 168 is set to be smaller than the thickness T1 of the first arm portion 176 of the arm portion 168. Instead of this, the thickness T2 and the thickness T1 are set to the same dimension, and only the groove portion 200 and the fragile portion 202 may be provided, so that the second arm portion 178 is broken at the fragile portion 202 in the maximal elastic deformation state.

Figure 14:
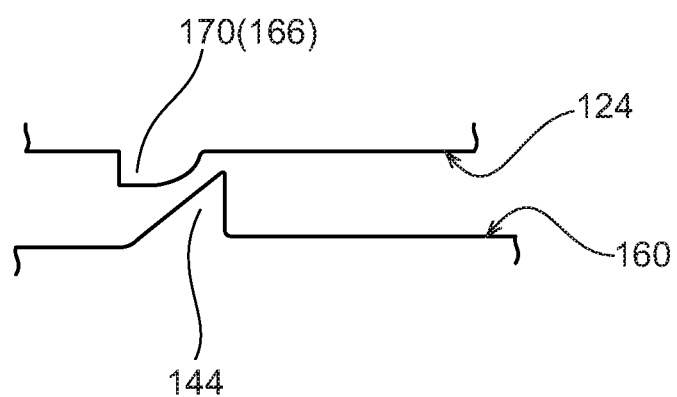
FIG. 14 is a side view when seen from the side opposite to the spool, which illustrates a part of the switching mechanism as a modified example.

Further, in the embodiment, the first modified example, and the second modified example, the casing portion 124 is provided with the subject engagement portion 144, the piston 160 is provided with the engagement claw portion 166, and the arm portion 168 of the engagement claw portion 166 is configured to be elastically deformable. Instead of this, the casing portion 124 may be provided with the engagement claw portion 166 serving as the engagement portion, and the piston 160 may be provided with the subject engagement portion 144 (FIG. 14). That is, the movement of the piston 160 toward one side in the movement direction may be permitted in a manner such that the engagement claw portion 166 of the casing portion 124 is pressed and displaced by the subject engagement portion 144 of the piston 160 when the piston 160 moves toward the one side in the movement direction.

Furthermore, in the embodiment, the first modified example, and the second modified example, the hook portion 170 is displaced in a manner such that the arm portion 168 of the engagement claw portion 166 is elastically deformed by being pressed by the subject engagement portion 144 when the piston 160 moves toward the one side in the movement direction, but the structure of moving the hook portion 170 is not limited thereto. For example, the hook portion 170 may be movably provided inside the piston 160, and a compression coil spring pressing the hook portion 170 toward the subject engagement portion 144 may be provided inside the piston 160. Accordingly, the movement of the piston 160 toward the one side in the movement direction may be permitted by retracting (displacing) the hook portion 170 toward the piston 160 side against the biasing force of the compression coil spring when the piston 160 moves toward the one side in the movement direction. That is, a configuration may be adopted in which the hook portion 170 is pressed by the subject engagement portion 144 when the piston 160 moves toward the one side in the movement direction.

Further, in the embodiment, the first modified example, and the second modified example, the engagement claw portion 166 is integrated with the piston 160. Instead of this, the engagement claw portion 166 may be provided separately from the piston 160. For example, the engagement claw portion 166 may be formed of metal having a spring property, and the piston 160 may be formed (molded) of a resin, and the engagement claw portion 166 is integrated with the piston 160 by welding or insert-molding.

Furthermore, in the embodiment, the first modified example, and the second modified example, the arm portion 168 extends along the movement direction of the piston 160, but the extension direction of the arm portion 168 is not limited thereto. For example, the arm portion 168 may be formed so as to be line-symmetrical with respect to the engagement surface 174 of the hook portion 170. That is, the arm portion 168 may extend so that the arm portion 168 is elastically deformed in a direction substantially perpendicular to the movement direction of the piston 160 (the vertical direction).

Further, in the embodiment, the first modified example, and the second modified example, the switching mechanism 120 adopts the subject engagement portion 144 and the engagement claw portion 166 of the piston 160. However, the engagement claw portion 166 and the subject engagement portion 144 may be applied to a pretensioner mechanism (a mechanism which rotates the spool 20 in the winding direction in a manner such that a gas generator is operated in the event of a collision of a vehicle, a piston inside a cylinder moves toward a pinion side, and a rack of the piston meshes with the pinion). In this case, for example, the engagement claw portion 166 may be integrally molded with the piston which is inside the cylinder by outsert molding or the like, and the inner peripheral portion of the cylinder may be provided with the subject engagement portion 144. Accordingly, due to that the arm portion 168 is elastically deformed when the gas generator is operated, the movement of the piston toward the pinion may be permitted. Also, due to that the hook portion 170 engages with the subject engagement portion 144, the movement of the piston toward the opposite side to the pinion may be restricted.

Furthermore, in the embodiment, the first modified example, and the second modified example, when the control device determines that the body shape of the passenger is less than a predetermined reference value based on the signal from the body shape detecting unit and the collision of the vehicle occurs based on the signal of the collision detection unit, the gas generator 194 is operated by the control device, but the timing at which the gas generator 194 is operated may be optionally set. For example, when the control device determines that the body shape of the passenger is less than a predetermined reference value and the collision of the vehicle occurs, the gas generator 194 may be operated after a predetermined specific time is elapsed.

Further, as described above, in the embodiment, the first modified example, and the second modified example, when the control device determines that the body shape of the passenger is less than a predetermined reference value and the collision of the vehicle occurs, the gas generator 194 is operated by the control device. Instead of this, the gas generator 194 may be operated by the control device when the control device determines that the acceleration of the vehicle is less than a predetermined reference value based on the signal of the collision detection unit and that the collision of the vehicle occurs. Accordingly, the load value of the force limiter load may be changed in accordance with the acceleration of the vehicle.

What is claimed is:

1. A webbing winding device comprising:
   a spool on which a webbing to be applied to a passenger is wound and which is rotated in a pull-out direction by the webbing being pulled out;
   a locking portion which inhibits rotation of the spool in the pull-out direction at least one of a time when a vehicle rapidly decelerates or a time when the spool rapidly rotates in the pull-out direction;
   a force limiter mechanism which permits rotation of the spool in the pull-out direction with a load larger than or equal to a force limiter load when the locking portion inhibits rotation of the spool in the pull-out direction;
   a pawl configured to be able to be positioned at a first position and at a second position, the pawl being able to change a load value of the force limiter load in accordance with an arranged position of the pawl;
   a piston which is linearly movable between a standby position and a maximum movement position, the piston moving from the standby position toward one side in a movement direction of the piston by being activated so that the pawl is positioned from the first position to the second position;
   an accommodation portion which accommodates the piston;
   an engaged portion which is provided in the accommodation portion; and
   an engagement portion which includes an arm portion provided in the piston so as to be elastically deformable and a hook portion provided protruding from the arm portion toward a side of the engaged portion, the engagement portion permitting movement of the piston toward the one side in the movement direction by the hook portion sliding on the engaged portion so that the arm portion is elastically deformed, and the engagement portion restricting movement of the piston toward the other side in the movement direction by the hook portion engaging with the engaged portion.

2. The webbing winding device of claim 1, further comprising a stopper portion which is provided in the piston, and which is disposed to be offset with respect to the engagement portion when seen from the one side in the movement direction of the piston, the stopper portion restricting movement of the piston toward the one side in the movement direction at the maximum movement position by the stopper portion abutting with the accommodation portion.

3. The webbing winding device of claim 2, wherein the arm portion is provided at the piston such that the arm portion extends along the movement direction of the piston, the arm portion is positioned between the piston and the engaged portion, and opposing end portions of the arm portion in a longitudinal direction of the arm portion are connected to the piston, and the hook portion is provided at an intermediate portion of the arm portion in the longitudinal direction.

4. The webbing winding device of claim 3, wherein the arm portion includes a first arm portion which is disposed at the one side in the movement direction of the piston with respect to the hook portion and a second arm portion which is disposed at the other side in the movement direction of the piston with respect to the hook portion, and a thickness of the second arm portion is set to be smaller than a thickness of the first arm portion.

5. The webbing winding device of claim 4, wherein the second arm portion is provided with a fragile portion.

6. The webbing winding device of claim 5, further comprising a groove portion which is provided in the second arm portion and is disposed at the fragile portion at a side of the piston.

7. The webbing winding device of claim 2, wherein
the engaged portion includes a slope surface and an engaged surface, and the hook portion includes a slide-surface and an engagement surface, and
the engagement portion permits movement of the piston, toward the one side in the movement direction, by the slide-surface sliding on the slope surface so that the arm portion is elastically deformed, and the engagement portion restricts movement of the piston, toward the other side in the movement direction, by the engagement surface engaging with the engaged surface.

8. The webbing winding device of claim 1, wherein the arm portion is provided at the piston such that the arm portion extends along the movement direction of the piston, the arm portion is positioned between the piston and the engaged portion, and opposing end portions of the arm portion in a longitudinal direction of the arm portion are connected to the piston, and the hook portion is provided at an intermediate portion of the arm portion in the longitudinal direction.

9. The webbing winding device of claim 8, wherein the arm portion includes a first arm portion which is disposed at the one side in the movement direction of the piston with respect to the hook portion and a second arm portion which is disposed at the other side in the movement direction of the piston with respect to the hook portion, and a thickness of the second arm portion is set to be smaller than a thickness of the first arm portion.

10. The webbing winding device of claim 9, wherein the second arm portion is provided with a fragile portion.

11. The webbing winding device of claim 10, further comprising a groove portion which is provided in the second arm portion and is disposed at the fragile portion at a side of the piston.

12. The webbing winding device of claim 8, wherein
the engaged portion includes a slope surface and an engaged surface, and the hook portion includes a slide-surface and an engagement surface, and
the engagement portion permits movement of the piston, toward the one side in the movement direction, by the slide-surface sliding on the slope surface so that the arm portion is elastically deformed, and the engagement portion restricts movement of the piston, toward the other side in the movement direction, by the engagement surface engaging with the engaged surface.

13. The webbing winding device of claim 1, wherein
the engaged portion includes a slope surface and an engaged surface, and the hook portion includes a slide-surface and an engagement surface, and
the engagement portion permits movement of the piston, toward the one side in the movement direction, by the slide-surface sliding on the slope surface so that the arm portion is elastically deformed, and the engagement portion restricts movement of the piston, toward the other side in the movement direction, by the engagement surface engaging with the engaged surface.

14. A webbing winding device comprising:
a spool on which a webbing to be applied to a passenger is wound and which is rotated in a pull-out direction by the webbing being pulled out;
a locking portion which inhibits rotation of the spool in the pull-out direction at least one of a time when a vehicle rapidly decelerates or a time when the spool rapidly rotates in the pull-out direction;
a force limiter mechanism which permits rotation of the spool in the pull-out direction with a load larger than or equal to a force limiter load when the locking portion inhibits rotation of the spool in the pull-out direction;
a pawl configured to be able to be positioned at a first position and at a second position, the pawl being able to change a load value of the force limiter load in accordance with an arranged position of the pawl;
a piston which is linearly movable between a standby position and a maximum movement position, the piston moving from the standby position toward one side in a movement direction of the piston by being activated so that the pawl is positioned from the first position to the second position;
an accommodation portion which accommodates the piston;
an engaged portion which is provided in one of the accommodation portion or the piston; and
an engagement portion which includes an elastic portion provided in the other of the accommodation portion or the piston so as to be elastically deformable and a hook portion provided at the elastic portion toward a side of the engaged portion, the engagement portion permitting movement of the piston toward the one side in the movement direction by the hook portion sliding on the engaged portion so that the elastic portion is elastically deformed, and the engagement portion restricting movement of the piston toward the other side in the movement direction by the hook portion engaging with the engaged portion.

* * * * *